(12) United States Patent
Sethi et al.

(10) Patent No.: US 12,282,790 B2
(45) Date of Patent: Apr. 22, 2025

(54) CLOUD-BASED PARALLEL PROCESSING AND COGNITIVE LEARNING COMPUTING PLATFORM

(71) Applicant: Bank of America Corporation, Charlotte, NC (US)

(72) Inventors: Jai Kumar Sethi, New Delhi (IN); Ruchi Mathur, Telangana (IN); Susheel Chiluka, Telangana (IN); Prashant Khare, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 827 days.

(21) Appl. No.: 17/528,767

(22) Filed: Nov. 17, 2021

(65) Prior Publication Data

US 2023/0153139 A1  May 18, 2023

(51) Int. Cl.
*G06F 8/77* (2018.01)
*G06F 9/455* (2018.01)
*G06N 3/04* (2023.01)
*G06N 3/047* (2023.01)
*G06N 3/098* (2023.01)

(52) U.S. Cl.
CPC ............ *G06F 9/45558* (2013.01); *G06F 8/77* (2013.01); *G06N 3/04* (2013.01); *G06N 3/047* (2023.01); *G06N 3/098* (2023.01); *G06F 2009/45566* (2013.01); *G06F 2009/4557* (2013.01); *G06F 2209/545* (2013.01)

(58) Field of Classification Search
CPC ....... G06F 8/77; G06F 2209/545; G06N 3/04; G06N 3/098
See application file for complete search history.

(56) References Cited

U.S. PATENT DOCUMENTS

| | | | |
|---|---|---|---|
| 10,824,950 B2 | 11/2020 | Jain et al. | |
| 10,902,333 B2 | 1/2021 | Lee et al. | |
| 2016/0203412 A1 * | 7/2016 | Merdivan | G06N 7/01 706/11 |
| 2018/0165604 A1 | 6/2018 | Minkin et al. | |
| 2018/0210913 A1 * | 7/2018 | Beller | G06F 16/9024 |

(Continued)

FOREIGN PATENT DOCUMENTS

| | | |
|---|---|---|
| EP | 3399418 A1 | 11/2018 |
| EP | 3663911 A1 | 6/2020 |
| JP | 4780921 B2 | 9/2011 |

*Primary Examiner* — Brian W Wathen
(74) *Attorney, Agent, or Firm* — Banner & Witcoff, Ltd.

(57) ABSTRACT

Aspects of the disclosure relate to a cloud-based parallel processing and cognitive learning computing platform. A computing platform may receive query data comprising a plurality of requested metrics. The computing platform may select a secondary node to process the query request from a plurality of secondary nodes of the computing platform. The computing platform may send the query request to the secondary node. The computing platform may send a request to generate a metric mapping table for a first requested metric to a cognitive learning module of the computing platform. The cognitive learning module may generate the metric mapping table for the first requested metric using neuron clusters that comprise a plurality of unique programmable quadratic function neurons. The computing platform may calculate a value for the first requested metric based on the metric mapping table.

20 Claims, 20 Drawing Sheets

(56) References Cited

U.S. PATENT DOCUMENTS

| | | | |
|---|---|---|---|
| 2019/0317965 A1* | 10/2019 | Remis | G06F 16/3322 |
| 2020/0012738 A1* | 1/2020 | Tung | G06F 16/9024 |
| 2022/0101189 A1* | 3/2022 | Ben-Itzhak | G06N 20/20 |

* cited by examiner

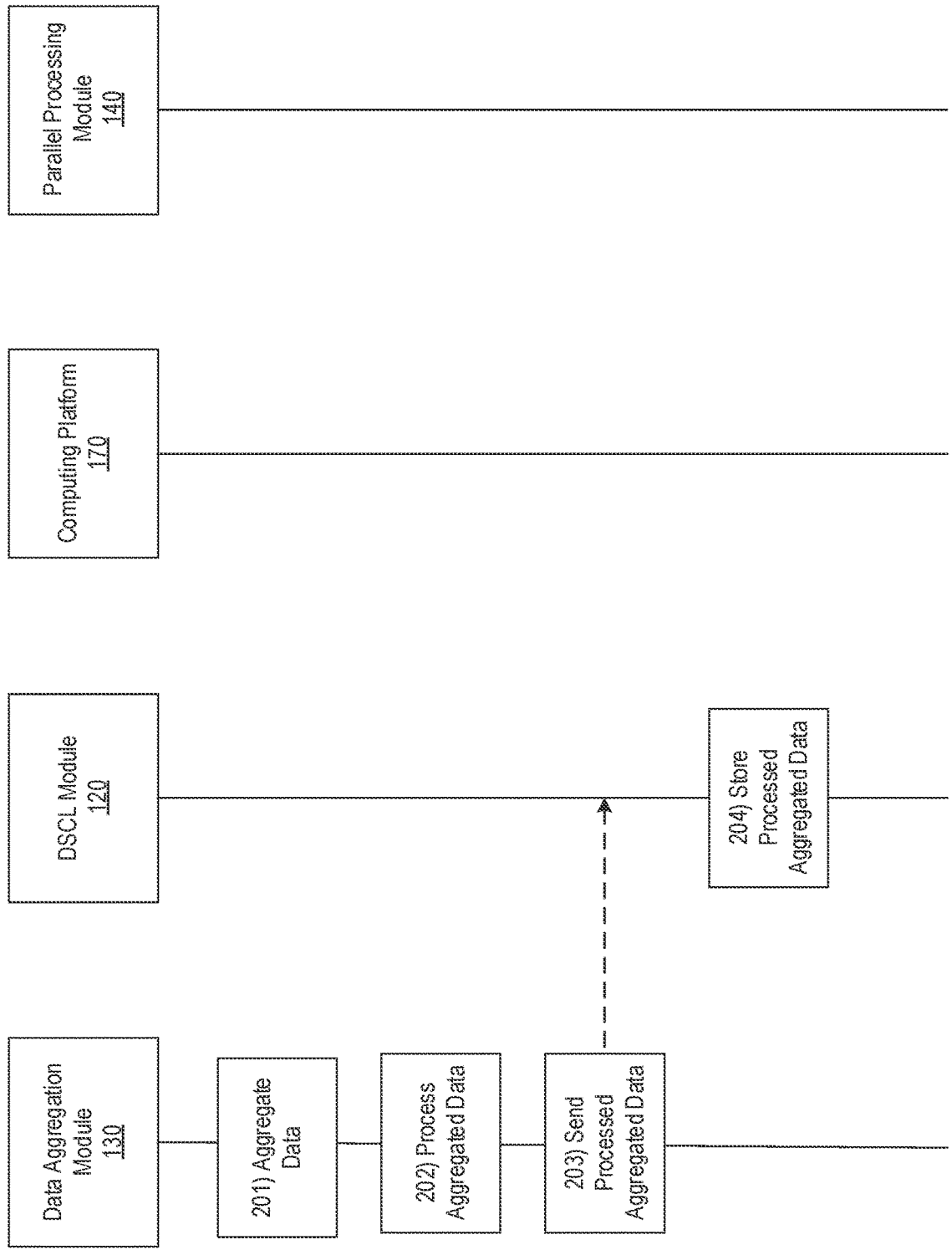

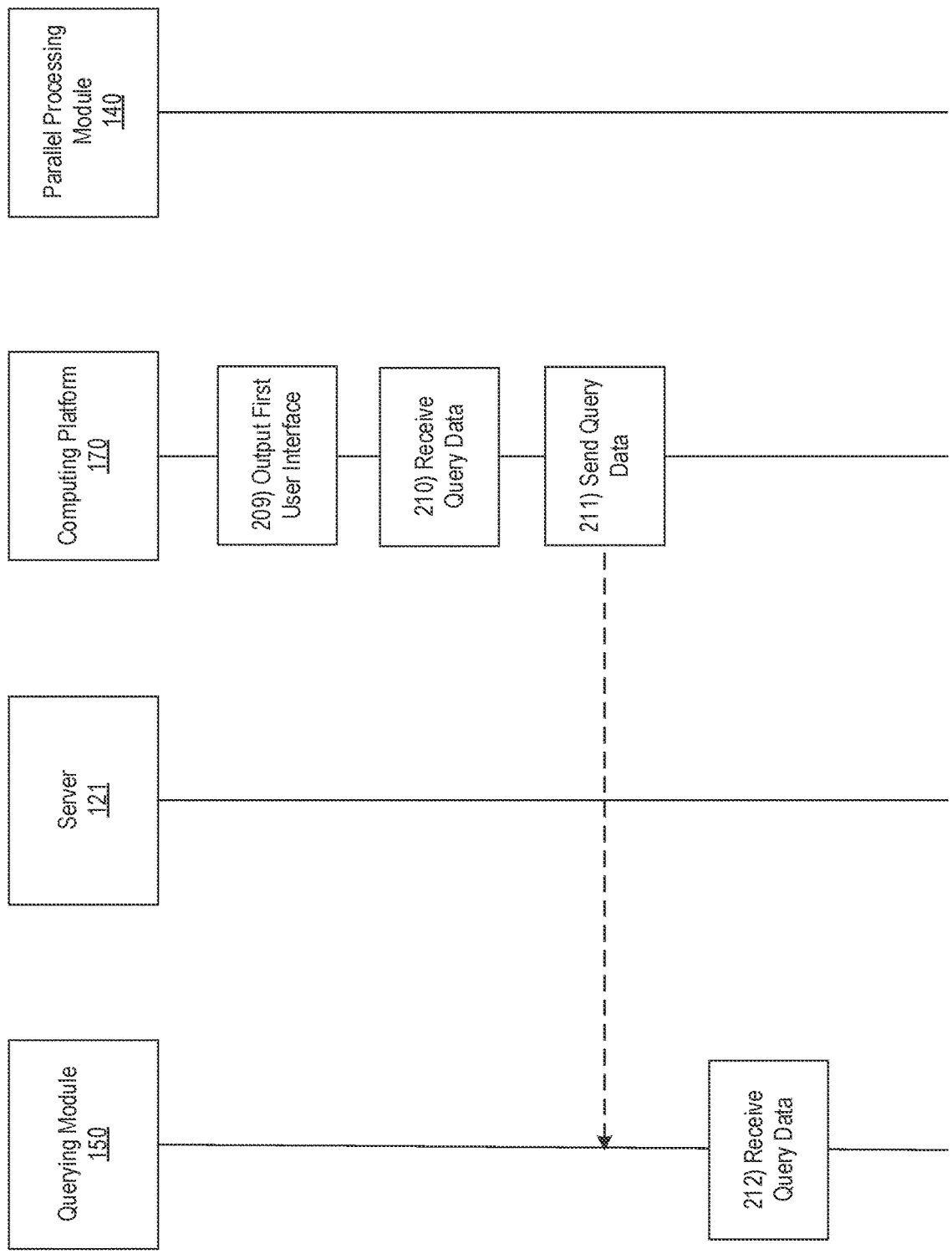

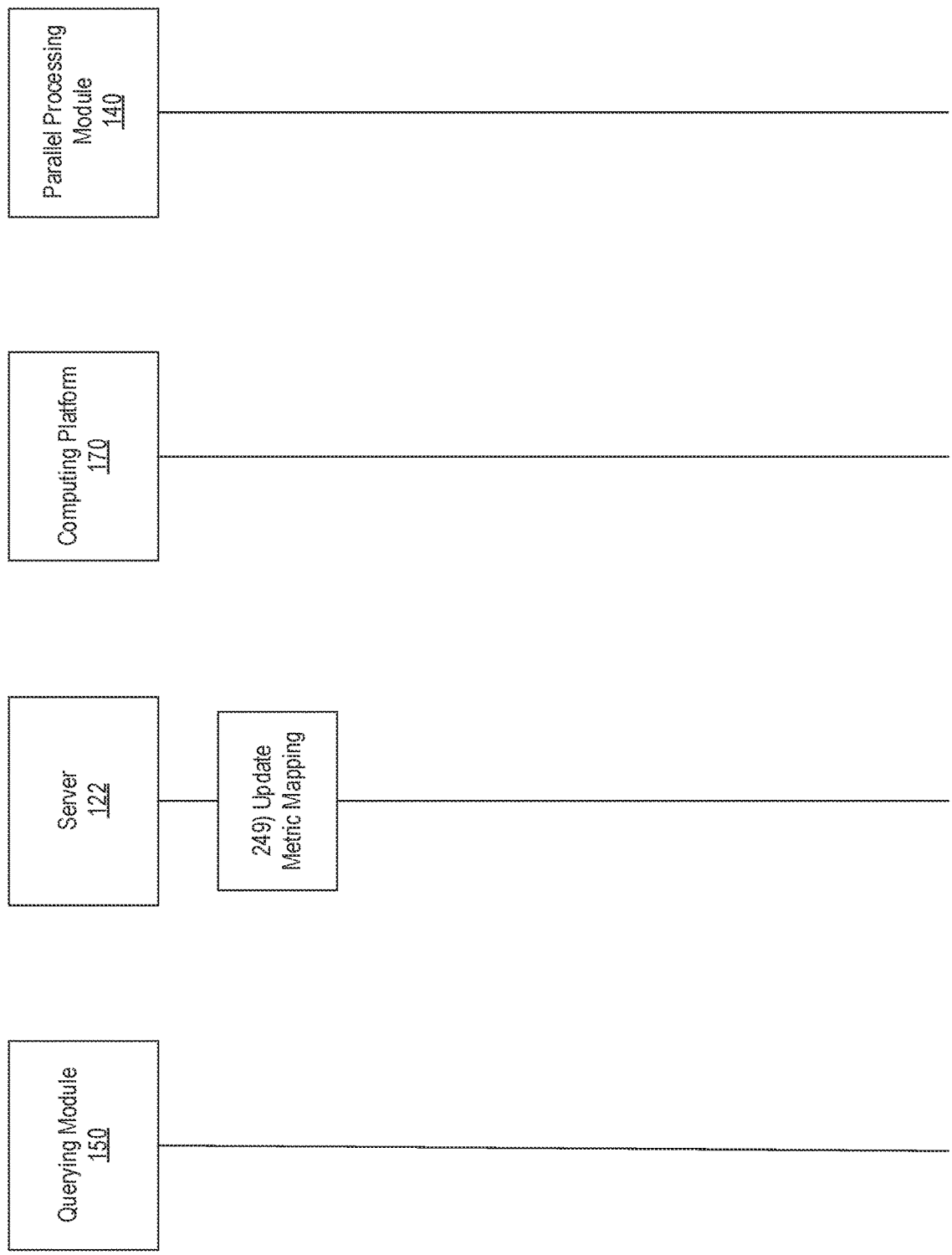

CLOUD-BASED PARALLEL PROCESSING AND COGNITIVE LEARNING COMPUTING PLATFORM

BACKGROUND

Aspects of the disclosure relate to a cloud-based parallel processing and cognitive learning computing platform. In particular, one or more aspects of the disclosure relate to utilizing the cloud-based parallel processing and cognitive learning computing platform to analyze large volumes of sub-metric data to generate metric mapping tables that can be used to calculate user-requested metric values.

In some cases, enterprise organizations may need to calculate tens or hundreds of thousands of metric value, often in parallel and each metric value based on tens or hundreds of thousands of sub-metrics. Processes that may efficiently calculate a small number of metric values do not scale up to this large level needed by large organizations, due to the sheer number of computations that need to be performed and the large number of sub-metrics that need to be analyzed. Additionally, traditional computing systems cannot handle such a high velocity of input data, much less perform thousands of calculations in parallel using that input data. To improve the calculation of thousands of metrics in parallel, there is a need for a platform that can use cloud-based parallel processing and cognitive learning modules to perform the necessary data processing, analysis, and computations.

SUMMARY

Aspects of the disclosure provide effective, efficient, scalable, and convenient technical solutions that address and overcome the technical problems associated with conventional metric computation and analysis systems. In accordance with one or more embodiments of the disclosure, a computing platform comprising at least one processor, a communication interface, and memory storing computer-readable instructions may receive a query request from a second computing platform. The computing platform may generate, in response to receiving the query request, a graphical user interface. The computing platform may send, to the second computing platform, the graphical user interface, wherein sending the graphical user interface to the second computing platform is configured to cause the second computing platform to output the graphical user interface for display to a display device of the second computing platform. The computing platform may receive, from the second computing platform, query data comprising a plurality of requested metrics. The computing platform may select, from a plurality of secondary nodes of the computing platform, a secondary node to process the query request. The computing platform may send the query request to the secondary node. The computing platform may, responsive to a determination by the secondary node that a metric mapping table for a first requested metric of the plurality of requested metrics is not stored within the memory of the computing platform, send, to a cognitive learning module of the computing platform, a request to generate the metric mapping table for the first requested metric. The computing platform may generate the metric mapping table for the first requested metric. The computing platform may calculate, based on the metric mapping table, a value for the first requested metric. The computing platform may generate a second graphical user interface comprising the value. The computing platform may send, to the second computing platform, the second graphical user interface, wherein sending the second graphical user interface to the second computing platform is configured to cause the second computing platform to output the second graphical user interface for display to the display device of the second computing platform.

In one or more instances, the computing platform may calculate, in parallel to calculating the value for the first requested metric, a second value for a second requested metric of the plurality of requested metrics. In one or more instances, the second value may be calculated based on a second metric mapping table associated with the second requested metric.

In one or more instances, the cognitive learning module may comprise a plurality of neuron clusters, each neuron cluster of the plurality of neuron clusters comprising a plurality of programmable quadratic function neurons. In one or more instances, the metric mapping table may be generated using one or more neurons of a first neuron cluster of the plurality of neuron clusters and a second one or more neurons of a second neuron cluster of the plurality of neuron clusters. In one or more instances, the first neuron may be programmed to use a first quadratic activation function and the second neuron may be programmed to use a second quadratic activation function. In one or more instances, the first neuron may be programmed to use first weights and the second neuron may be programmed to use second weights.

In one or more instances, the secondary node may be selected based on a current processing load of each of the plurality of secondary nodes. In one or more instances, the secondary node may be further selected based on an estimated processing load for the query data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2M depict an illustrative event sequence for implementing a cloud-based parallel processing and cognitive learning computing platform in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a cloud-based parallel processing and cognitive learning computing platform that includes a plurality of modules. An enterprise may need to analyze tens or hundreds of thousands of sub-metrics in order to calculate tens or hundreds of metrics in parallel. But conventional computing systems do not currently have the processing capabilities to perform such a large amount of analysis and calculations at such a high velocity.

To improve the accuracy, cost-efficiency, and time-efficiency of parallel sub-metric analysis and metric calculations, an enterprise may implement a cloud-based parallel processing and cognitive learning computing platform. The functionality of the cloud-based parallel processing and cognitive learning computing platform, may be implemented using a plurality of modules, such as a data aggregation module, a querying module, a parallel processing module, and a distributed storage and cognitive learning module (discussed in detail below). The use of these modules is exemplary, and the functionality may be implemented via a fewer number or greater number of modules. The cloud-based parallel processing and cognitive learning computing platform may aggregate, process, and store the sub-metrics on one or more cloud-based distributed servers. These servers may include secondary nodes and cognitive learning modules. The cognitive learning modules may each comprise a plurality of neuron clusters that are trained using historical data and then utilized to perform necessary calculations.

Figure 1A:
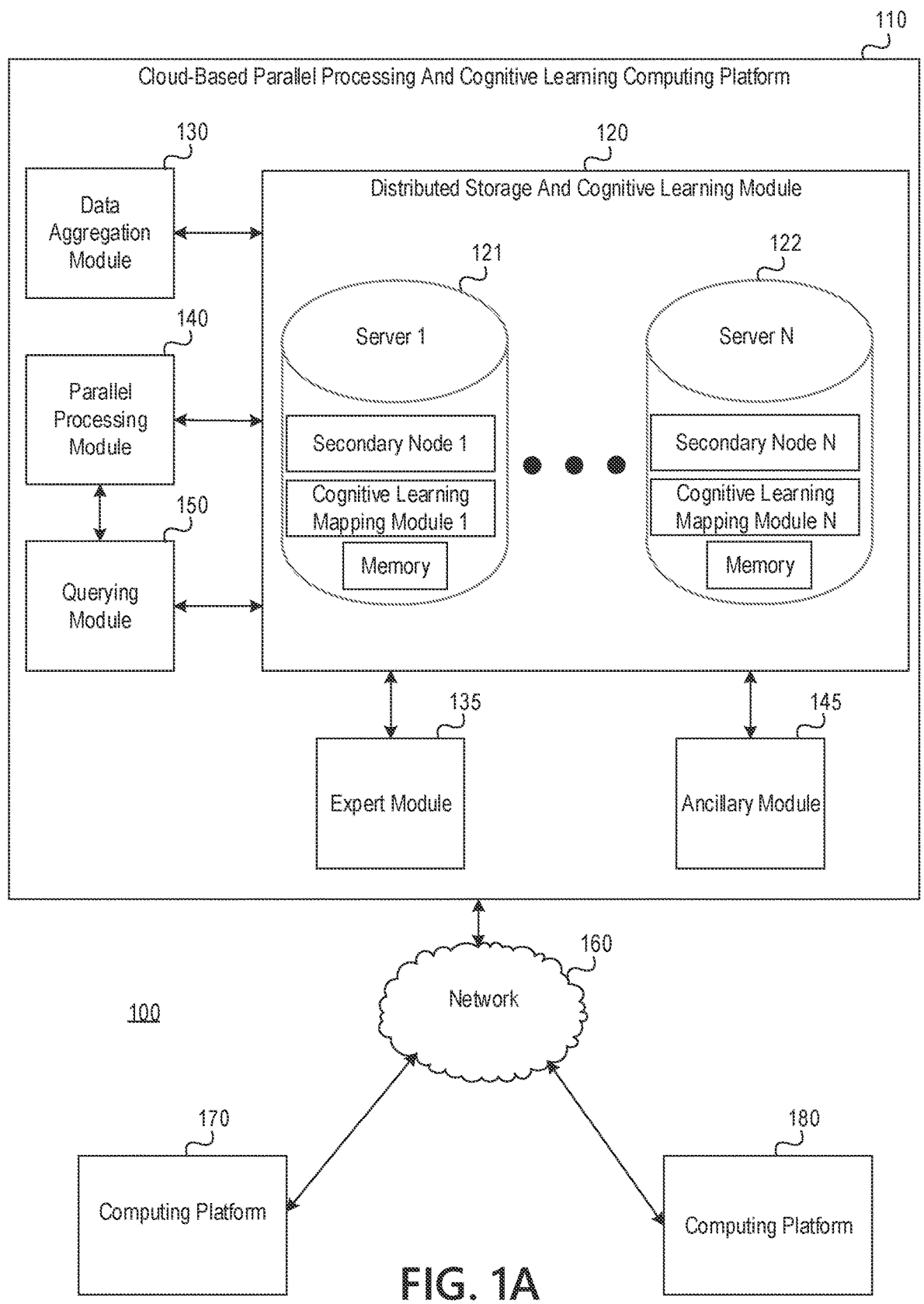
FIGS. 1A-1B depict an illustrative computing environment for implementing a cloud-based parallel processing and cognitive learning computing platform in accordance with one or more example embodiments.
Figure 1B:
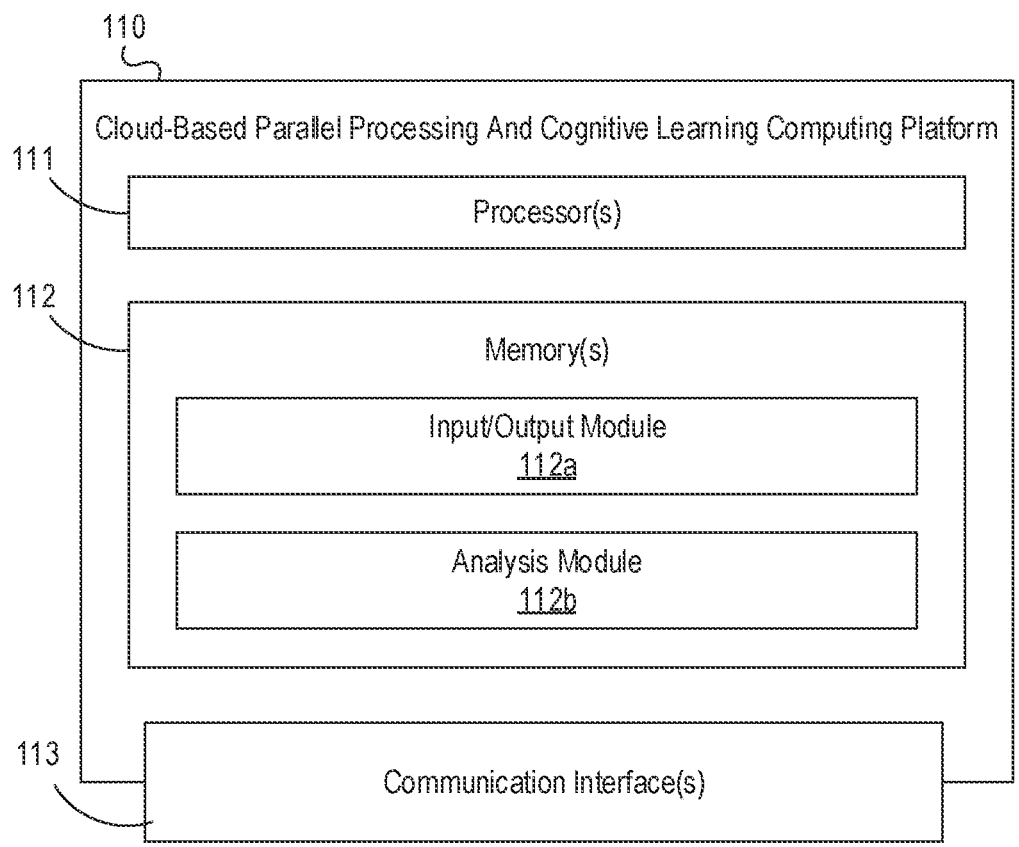

FIGS. 1A-1B depict an illustrative computing environment that implements a cloud-based parallel processing and cognitive learning computing platform in accordance with one or more arrangements described herein. Referring to FIG. 1A, computing environment 100 may include one or more computer systems. For example, computing environment 100 may include cloud-based parallel processing and cognitive learning computing platform 110, computing platform 170, and computing platform 180.

As described further below, cloud-based parallel processing and cognitive learning computing platform 110 may be a computer system that includes one or more computing devices (e.g., servers, server blades, or the like) and/or other computer components (e.g., processors, memories, communication interfaces) that may be used to generate, configure, and/or execute one or more metric-based queries. In some instances, cloud-based parallel processing and cognitive learning computing platform 110 may be controlled or otherwise maintained by an enterprise organization such as a financial institution. Cloud-based parallel processing and cognitive learning computing platform 110 may include one or more modules, such as distributed storage and cognitive learning module 120, data aggregation module 130, parallel processing module 140, and querying module 150. Although shown as separate modules, the functionalities of distributed storage and cognitive learning module 120, data aggregation module 130, parallel processing module 140, and querying module 150 may be integrated into any number of joint or separate modules. Distributed storage and cognitive learning module 120 may include one or more servers, such as server 121 and server 122. Although only two servers are illustrated, any number of servers similar to servers 121 and 122 may be used to implement distributed storage and cognitive learning module 120. Each server of distributed storage and cognitive learning module 120 may include a secondary node, a cognitive learning mapping module, and memory. A secondary node may be used to process user queries comprising requests to calculate one or more metric values. The cognitive learning mapping module may be used to generate metric mapping tables used to calculate the requested metric values. Although each server of distributed storage and cognitive learning module 120 is illustrated as having its own cognitive learning mapping module, in an alternative configuration, a common cognitive learning mapping module may be shared by one or more servers of distributed storage and cognitive learning module 120.

Computing platform 170 may be a computer system that includes one or more computing devices (e.g., servers, server blades, laptop computers, desktop computers, mobile devices, tablets, smart phones, credit card readers, or the like) and/or other computer components (e.g., processors, memories, communication interfaces) that may be used to perform enterprise operations and/or data processing. In one or more instances, computing platform 170 may be configured to communicate with cloud-based parallel processing and cognitive learning computing platform 110 for query generation, configuration, and/or execution. Computing platform 180 may be a computing platform similar to computing platform 170.

Computing environment 100 also may include one or more networks, which may interconnect cloud-based parallel processing and cognitive learning computing platform 110, computing platform 170 and computing platform 180. For example, computing environment 100 may include a network 160 (which may interconnect, e.g., cloud-based parallel processing and cognitive learning computing platform 110, computing platform 170 and computing platform 180).

In one or more arrangements, cloud-based parallel processing and cognitive learning computing platform 110, computing platform 170 and computing platform 180, may be any type of computing device capable of sending and/or receiving requests and processing the requests accordingly. For example, cloud-based parallel processing and cognitive learning computing platform 110, computing platform 170 and computing platform 180, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cloud-based parallel processing and cognitive learning computing platform 110, computing platform 170 and computing platform 180, may, in some instances, be special-purpose computing devices configured to perform specific functions.

Referring to FIG. 1B, cloud-based parallel processing and cognitive learning computing platform 110 may include one or more processors 111, memory 112, and communication interface 113. A data bus may interconnect processor 111, memory 112, and communication interface 113. Communication interface 113 may be a network interface configured to support communication between cloud-based parallel processing and cognitive learning computing platform 110 and one or more networks (e.g., network 160, or the like). Memory 112 may include one or more program modules having instructions that when executed by processor 111 cause cloud-based parallel processing and cognitive learning computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of cloud-based parallel processing and cognitive learning computing platform 110 and/or by different computing devices that may form and/or otherwise make up cloud-based parallel processing and cognitive learning computing platform 110. For example, memory 112 may have, host, store, and/or include input/output module 112a and analysis module 112b.

Input/Output module 112a may have instructions that direct and/or cause cloud-based parallel processing and cognitive learning computing platform 110 to receive input data from any of the computing platforms shown in FIG. 1A (i.e., computing platform 170, computing platform 180), to output data to any of the computing platforms shown in FIG. 1A (i.e., computing platform 170, computing platform 180), to receive data from computing platforms not shown in FIG. 1A, such as non-depicted servers that store financial data associated with a financial enterprise, and/or to facilitate the exchange of any data between any of the modules that make up cloud-based parallel processing and cognitive learning computing platform 110, such as distributed storage and cognitive learning module 120 (including server 121, server 122, and/or the like), data aggregation module 130, parallel processing module 140, and querying module 150. Analysis module 112b may have instructions that direct and/or cause cloud-based parallel processing and cognitive learning computing platform 110 (or any of the modules that make up cloud-based parallel processing and cognitive learning computing platform 110, such as distributed storage and cognitive learning module 120 (including server 121, server 122, and/or the like), data aggregation module 130, parallel processing module 140, and querying module 150, to analyze any data that flows within, in, or out, of cloud-based parallel processing and cognitive learning computing platform 110.

Figure 2B:
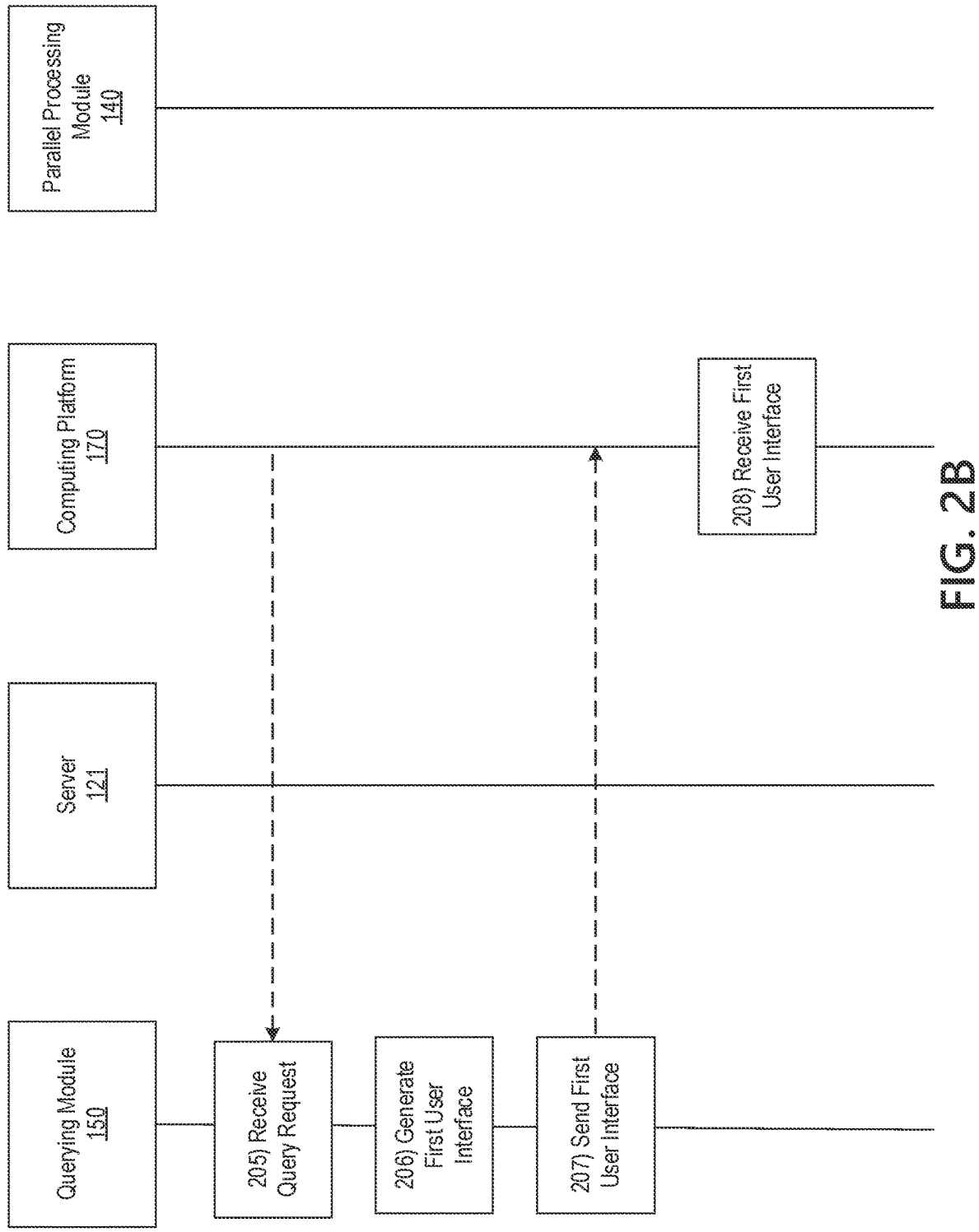

FIGS. 2A-2M depict an illustrative event sequence for implementing a cloud-based parallel processing and cognitive learning computing platform in accordance with one or more example embodiments. Referring to FIG. 2A, at step 201, data aggregation module 130 of cloud-based parallel processing and cognitive learning computing platform 110 may aggregate data. The aggregated data may be sub-metric data that may be used by cloud-based parallel processing and cognitive learning computing platform 110 to generate metric mapping tables that may be used to calculate user-requested metric values. Data aggregation module 130 may aggregate data by requesting data from any number of computing platforms (including servers) maintained by a financial platform. In certain instances, these computing platforms may send data to data aggregation module 130 without data aggregation module 130 needing to request the data.

The data may be aggregated as it is generated, at regular time intervals, in batches, and/or the like. In one example, the aggregated data may be transactional data associated with a financial enterprise. The transactional data may include one or more parameters and values for those parameters, such as user identification data, transaction date, transaction amount, transaction parties, transaction type, transaction identification, and/or the like. Any number of parameters (and corresponding values) may make up the transactional data. Data aggregation module 130 may receive any amount of transactional data (e.g., data for tens, hundreds, thousands, or millions of transactions).

At step 202, data aggregation module 130 may process the data aggregated by data aggregation module 130 at step 201. Data aggregation module 130 may process the aggregated data by analyzing the aggregated data to determine if the aggregated data comprises any confidential or sensitive data. If data aggregation module 130 determines that the aggregated data does comprise sensitive or confidential data, data aggregation module 130 may delete or mask the sensitive or confidential data.

At step 203, data aggregation module 130 may send the processed aggregated data to distributed storage and cognitive learning module 120 of cloud-based parallel processing and cognitive learning computing platform 110. Given the potential need for sending large volumes of data at step 203, data aggregation module 130 may send the processed aggregated data differently based on the amount of data to be sent. For example, data aggregation module 130 may initiate a data stream with distributed storage and cognitive learning module 120 and stream the processed aggregated data while it is being generated by data aggregation module 130. In another example, data aggregation module 130 may send the processed aggregated data to distributed storage and cognitive learning module 120 in batches. In another example, data aggregation module 130 may send the processed aggregated data to distributed storage and cognitive learning module 120 at predetermined time intervals. In yet another example, data aggregation module 130 may store the processed aggregated data in one or more storage locations, and then send the storage location to distributed storage and cognitive learning module 120. Distributed storage and cognitive learning module 120 may then retrieve the processed aggregated data from the one or more storage locations.

At step 204, distributed storage and cognitive learning module 120 may store the processed aggregated data that distributed storage and cognitive learning module 120 received from data aggregation module 130 of cloud-based parallel processing and cognitive learning computing platform 110 at step 203 (or that distributed storage and cognitive learning module 120 retrieved from the one or more storage locations sent from data aggregation module 130 to distributed storage and cognitive learning module 120). As shown in FIG. 1A, distributed storage and cognitive learning module 120 may comprise a plurality of servers. Although only two servers, server 121 and server 122 are illustrated in FIG. 1A, distributed storage and cognitive learning module 120 may include a greater number of servers. The servers of distributed storage and cognitive learning module 120 may be located on a private cloud network maintained by a financial enterprise. Each server of distributed storage and cognitive learning module 120 may include memory to store processed aggregated data. For any given processed aggregated data received (or retrieved) by distributed storage and cognitive learning module 120, distributed storage and cognitive learning module 120 may store that processed aggregated data on any number of its servers. The number of servers on which distributed storage and cognitive learning module 120 stores any given processed aggregated data may depend on the need for redundancy for that processed aggregated data, the storage availability of one or more servers of distributed storage and cognitive learning module 120, the size of the processed aggregated data, and/or the like. To store the processed aggregated data on one or more of its servers, distributed storage and cognitive learning module 120 may send the processed aggregated data to the one or more servers along with instructions to store the data. Alternatively, distributed storage and cognitive learning module 120 may send the processed aggregated data to a first server (such as server 121 of distributed storage and cognitive learning module 120) along with instructions to store the data, and may then additionally send, to one or more additional servers (such as server 122 of distributed storage and cognitive learning module 120), instructions to retrieve the stored processed aggregated data from the first server. The one or more additional servers of distributed storage and cognitive learning module 120 may then retrieve the processed aggregated data from the first server of distributed storage and cognitive learning module 120 and store the retrieved data.

Referring to FIG. 2B, at step 205, querying module 150 of cloud-based parallel processing and cognitive learning computing platform 110 may receive a query request from computing platform 170. Computing platform 170 may send the query request to querying module 150 in response to receiving a user request at computing platform 170 to submit a query to querying module 150. In response to receiving the query request from computing platform 170 at step 205, querying module 150 may generate, at step 206, a first graphical user interface.

Figure 3A:
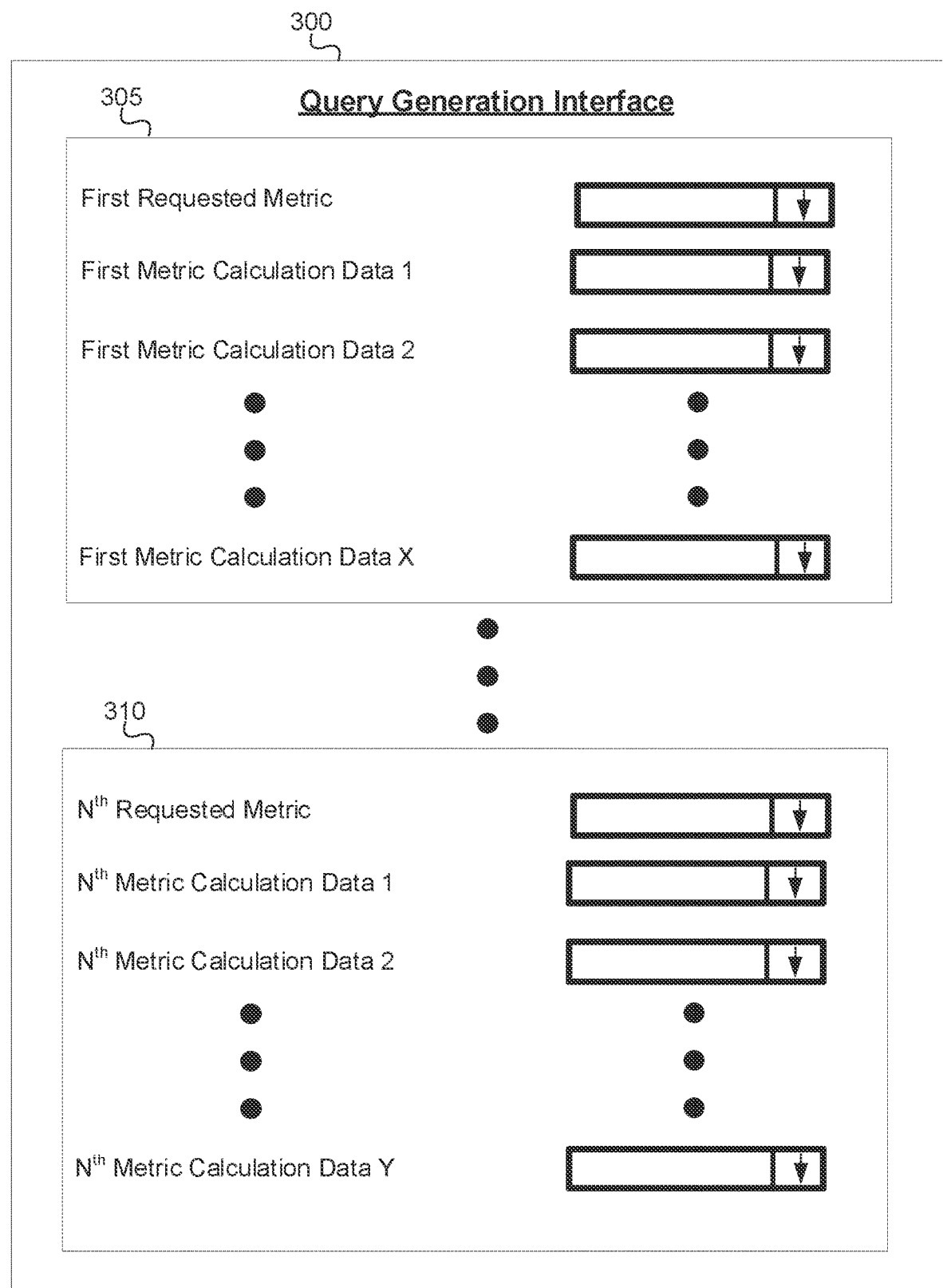
FIGS. 3A-3B depict illustrative graphical user interfaces that implement a cloud-based parallel processing and cognitive learning computing platform in accordance with one or more example embodiments.

FIG. 3A illustrates an example first graphical user interface 300 that may be generated by querying module 150 of cloud-based parallel processing and cognitive learning computing platform 110 at step 206 and presented to the user at computing platform 170 in response to a user request to submit a query. The first graphical user interface 300 may include sections 305 and 310. The query may comprise a request to calculate one or more metrics. Each metric may be associated with a different section of first graphical user interface 300. For example, section 305 of first graphical user interface 300 may be associated with a request to calculate a first metric and section 310 of first graphical user interface 300 may be associated with a request to calculate an $N^{th}$ metric. Thus, although only two sections are shown in FIG. 3A (i.e., the user is only requesting the calculation of two metrics from cloud-based parallel processing and cognitive learning computing platform 110), the user may request the calculation of any number of metrics from cloud-based parallel processing and cognitive learning computing platform 110.

Section 305 of first graphical user interface 300 may include one or more data fields for receiving metric calculation data for the first metric that the user is requesting cloud-based parallel processing and cognitive learning computing platform 110 to calculate (shown as first metric calculation data 1, first metric calculation data 2, and first metric calculation data X). Similarly, section 310 of first graphical user interface 300 may include one or more data fields for receiving metric calculation data for the $N^{th}$ metric that the user is requesting cloud-based parallel processing and cognitive learning computing platform 110 to calculate (shown as $N^{th}$ metric calculation data 1, $N^{th}$ metric calculation data 2, and $N^{th}$ metric calculation data Y). Each section of first graphical user interface 300 may include a greater or fewer number of data fields than that shown in FIG. 3A. The metric calculation data may include one or more parameters to be used to configure the calculation of the requested metric. The parameters may be predefined by cloud-based parallel processing and cognitive learning computing platform 110 and/or may be defined by the user using first graphical user interface 300.

Referring back to FIG. 2B, at step 207, querying module 150 may send the first graphical user interface 300 generated by querying module 150 at step 206 to computing platform 170. The sending of the first graphical user interface 300 by querying module 150 to computing platform 170 may cause and/or be configured to cause computing platform 170 to output the first graphical user interface 300 for display to a user. Specifically, at step 208, computing platform 170 may receive the first graphical user interface 300 from querying module 150. Referring to FIG. 2C, at step 209, computing platform 170 may output the first graphical user interface 300 received by computing platform 170 from querying module 150 to a display device of computing platform 170.

At step 210, in response to outputting the first graphical user interface 300 to the display device, computing platform 170 may receive first query data via the first graphical user interface 300. The first query data may include the requested metrics and the metric calculation data discussed above with reference to FIG. 3A. At step 211, computing platform 170 may send the first query data (e.g., the requested metrics and the metric calculation data) to querying module 150. At step 212, querying module 150 may receive the first query data from computing platform 170.

Figure 2D:
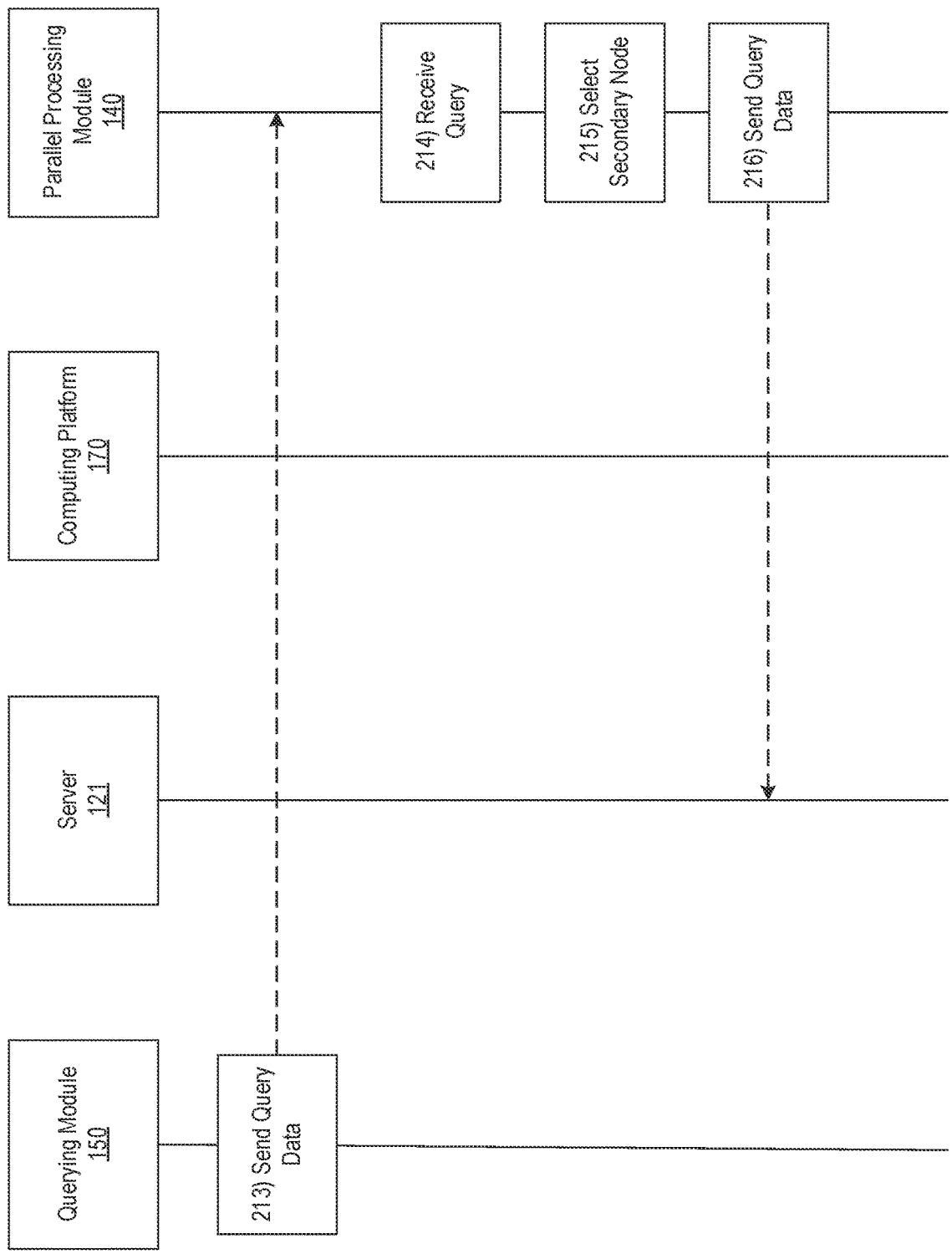

Referring to FIG. 2D, at step 213, querying module 150 may send the first query data received from computing platform 170 to parallel processing module 140 of cloud-based parallel processing and cognitive learning computing platform 110. At step 214, parallel processing module 140 may receive the first query data from querying module 150. In one example, the first query data may be received by a primary node of parallel processing module 140. At step 215, parallel processing module 140 may process the first query data to select a secondary node of cloud-based parallel processing and cognitive learning computing platform 110 to process the query. In one example, this processing and selecting may be performed by the primary node of parallel processing module 140 that received the first query data from querying module 150. As discussed above with reference to FIG. 1A, distributed storage and cognitive learning module 120 may include one or more servers (such as server 121 and server 122), each of which may comprise a secondary node. These secondary nodes may be utilized by cloud-based parallel processing and cognitive learning computing platform 110 to execute a plurality of different processes, including responding to user queries received by querying module 150 from computing platforms such as computing platform 170 and/or computing platform 180. Parallel processing module 140 may consider any number and/or combination of parameters when selecting a secondary node from the plurality of secondary nodes of distributed storage and cognitive learning module 120 to process the query. For example, parallel processing module 140 may consider the location of the data that will be needed to calculate the requested metric(s) in the query (for example, which server(s) of cloud-based parallel processing and cognitive learning computing platform 110 store the metric data that would be needed to calculate the requested metric(s) in the query, the current processing load of each secondary node (and/or its corresponding server) of cloud-based parallel processing and cognitive learning computing platform 110, the projected processing load of calculating the requested metric(s) in the query, and/or the like). In addition, parallel processing module 140 may assign weights to any parameters when considering multiple parameters during the selection of a secondary node.

Figure 2E:
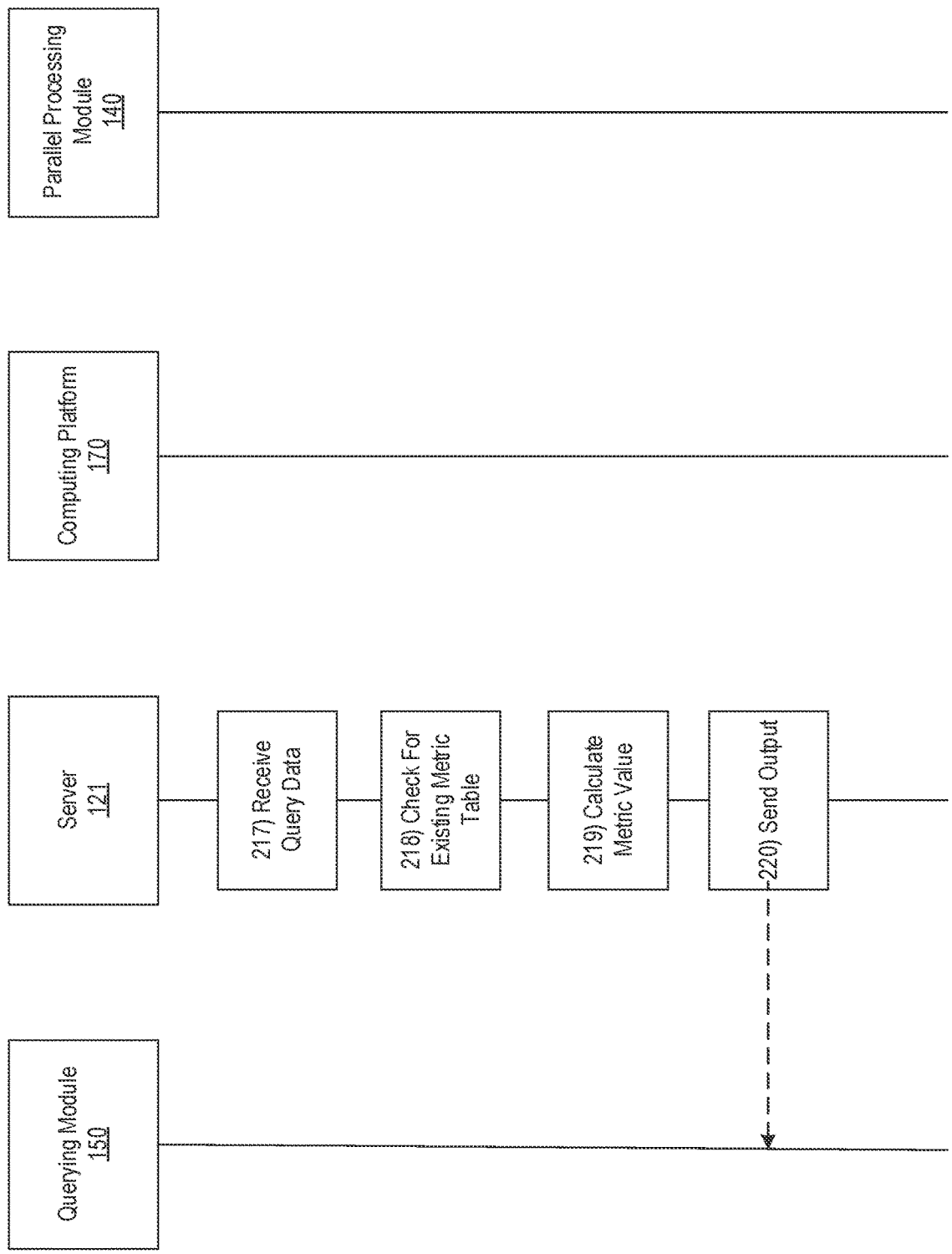

At step 216, parallel processing module 140 may send the first query data to the server of distributed storage and cognitive learning module 120 corresponding to the selected secondary node (here, server 121 of cloud-based parallel processing and cognitive learning computing platform 110). Referring to FIG. 2E, at step 217, secondary node of server 121 of distributed storage and cognitive learning module 120 may receive the first query data from parallel processing module 140. As discussed above, the first query data may include one or more metrics to be calculated by cloud-based parallel processing and cognitive learning computing platform 110 (or more specifically here, secondary node of server 121 of distributed storage and cognitive learning module 120), and for each of those one or more metrics, underlying metric data to configure the calculation. In order to calculate a requested metric, secondary node of server 121 may utilize a metric mapping table. Distributed storage and cognitive learning module 120 may comprise any number of metric mapping tables, each associated with a particular metric. These metric mapping tables may be redundantly stored across one or more servers of distributed storage and cognitive learning module 120, such as server 121 and server 122. Each metric mapping table may include mappings between different combinations of values of any number of data points (tens of data points, hundreds of data points, thousands of data points, millions of data points) and the corresponding metric value for each of those combinations. The metric mapping table may be optimally designed to be vertically large (as opposed to horizontally large) to minimize the look-up time for metric values. The metric mapping table for any given metric may have been previously generated by a cognitive learning module of distributed storage and cognitive learning module 120 and then distributed by distributed storage and cognitive learning module 120 across any number of its servers for storage. In addition to initially generating the metric mapping tables, the cognitive learning module may continuously update the metric mapping tables stored across the servers of distributed storage and cognitive learning module 120 based on updated metric calculations and updated training data. The initial generation of metric mapping tables and the subsequent updating of those metric mapping tables is discussed in further detail below with reference to FIG. 2K.

At step 218, secondary node of server 121 may determine, for a given metric of the one or more requested metrics, whether an existing metric mapping table already exists for that metric. To make such a determination, secondary node of server 121 may query the memory of server 121 to determine if the memory of server 121 is currently storing a metric mapping table corresponding to the requested metric. At step 219, in response to determining that the memory of server 121 is currently storing a metric mapping table corresponding to the requested metric, secondary node of server 121 may calculate the requested metric value using the corresponding metric mapping table and the metric data from the first query data. The metric data may specify particular data points to be used to configure the metric calculation. Steps 218 and 219 may be repeated by secondary node of server 121 for each requested metric included in the first query data received by secondary node of server 121 from parallel processing module 140 at step 217. If an existing metric table does not exist for a requested metric value, the metric mapping table may be generated by cognitive learning module of server 121 (discussed below with reference to step 241) and subsequently used to calculate the requested metric value at step 219. Secondary node of server 121 may process each requested metric in parallel or serially. At step 220, secondary node of server 121 may send the output to querying module 150. The output generated by secondary node of server 121 and sent to querying module 150 may comprise each of the metric values calculated by secondary node of server 121 based on the metric mapping table(s) and metric data, and accompanying metric calculation data.

Figure 2F:
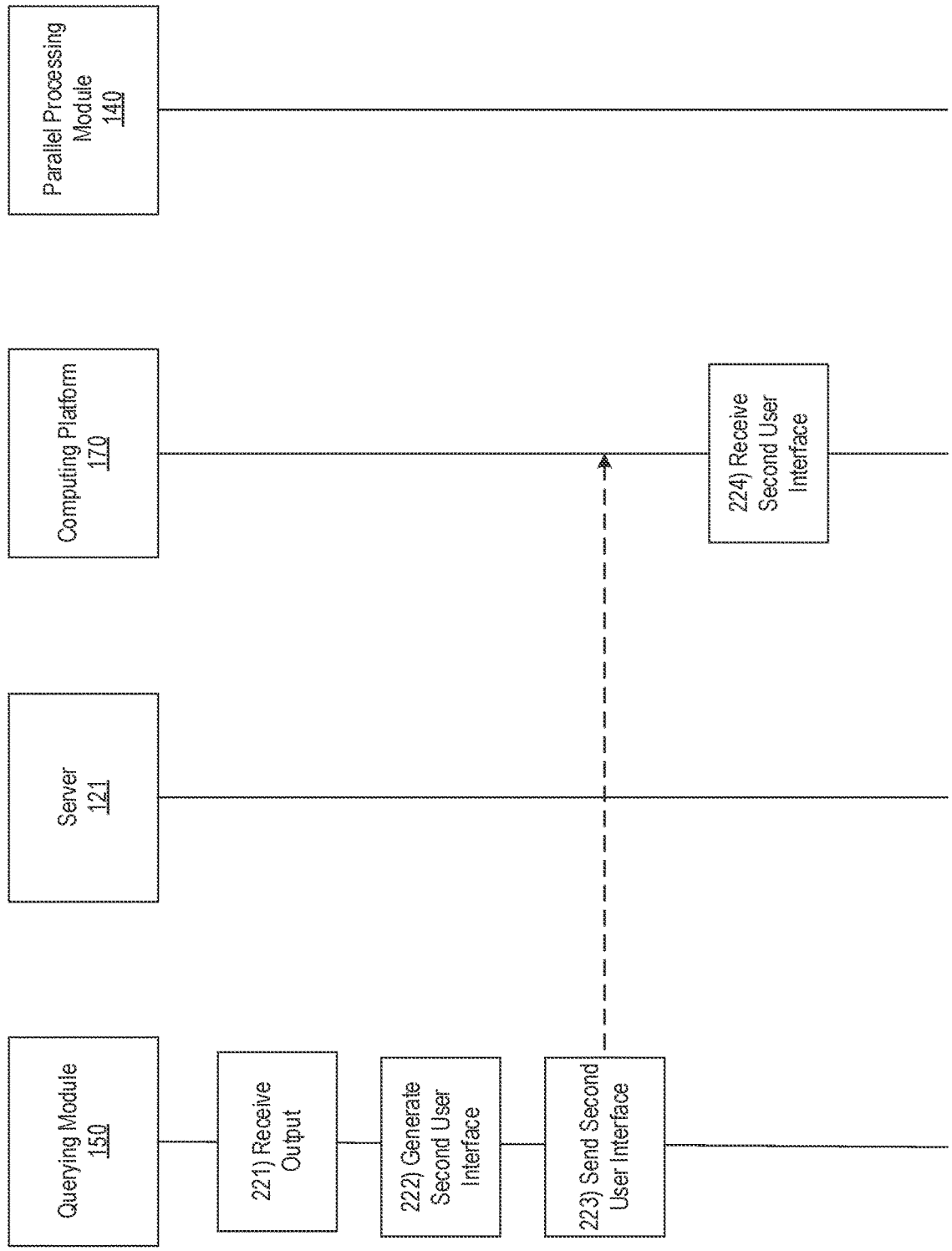
Figure 3B:
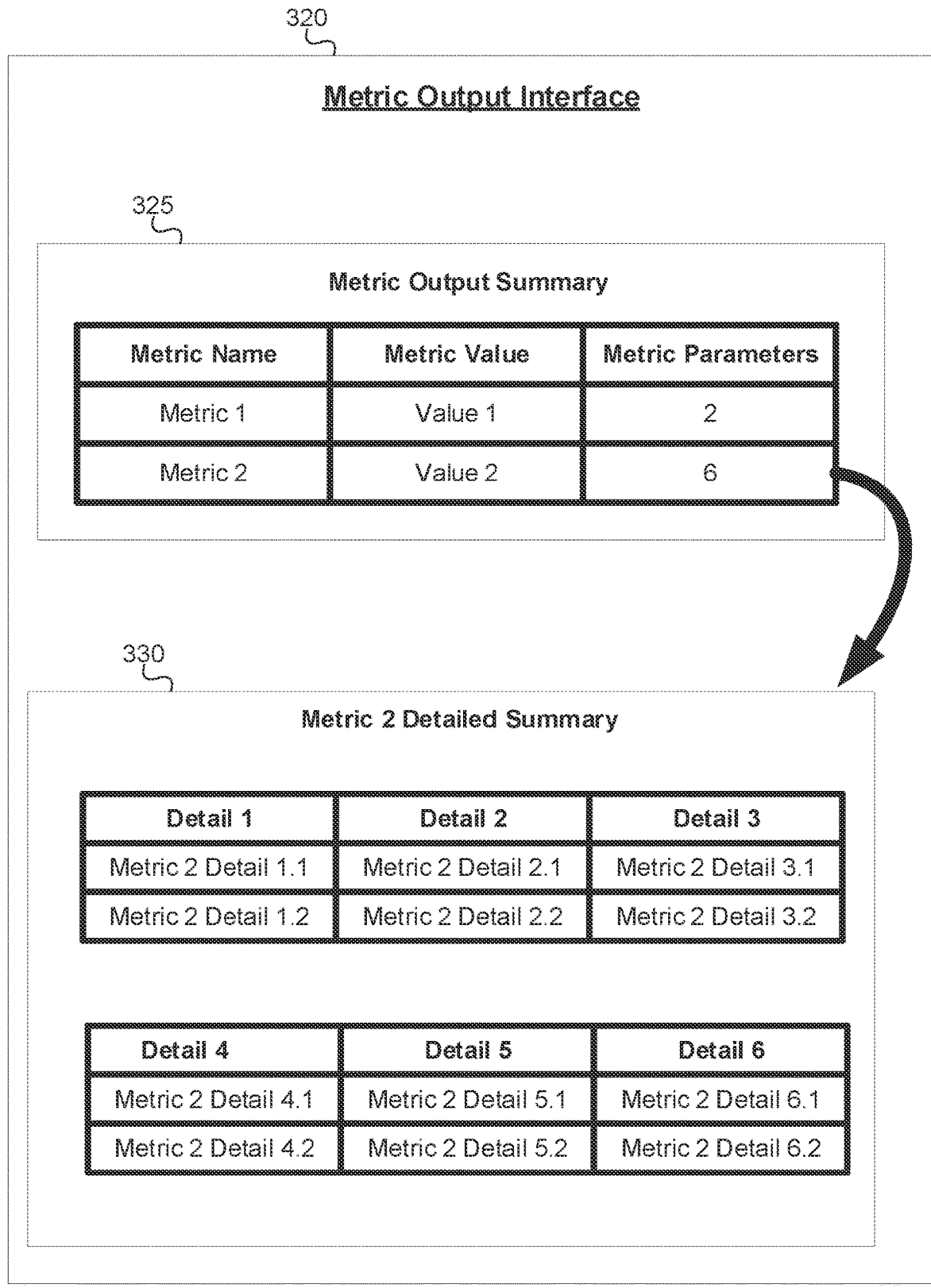

Referring to FIG. 2F, at step 221, querying module 150 may receive the output sent by secondary node of server 121 of cloud-based parallel processing and cognitive learning computing platform 110. At step 222, in response to receiving the output from secondary node of server 121, querying module 150 may generate a second graphical user interface. FIG. 3B illustrates an example second graphical user interface 320 that may be generated by querying module 150 at step 221 and presented to the user in response to querying module 150 receiving the output from secondary node of server 121. The second graphical user interface 320 may include sections 325 and 330. Section 325 of second graphical user interface 320 may provide a metric overview summary for the requested metrics and section 330 of second graphical user interface 320 may provide a detailed summary for a select metric.

In the example shown in FIG. 3B, two different metrics are listed in section 325 (but, as noted above, any given number of metrics may be listed, depending on the number of metric calculations requested by the user). For each metric, the metric output summary provides metric identification data (the name of the metric, shown as Metric 1 and Metric 2), the calculated value for the metric (shown as Value 1 and Value 2), and the number of different data points used to calculate the metric. In response to the user selecting a particular metric listed in section 325, section 330 may be displayed to the user. For example, in response to the user selecting Metric 2 in section 325, the user may be presented with the metric detailed summary for Metric 2. The detailed summary for Metric 2 may include a detailed summary of the different values of the different data points used to calculate Metric 2.

Figure 2G:
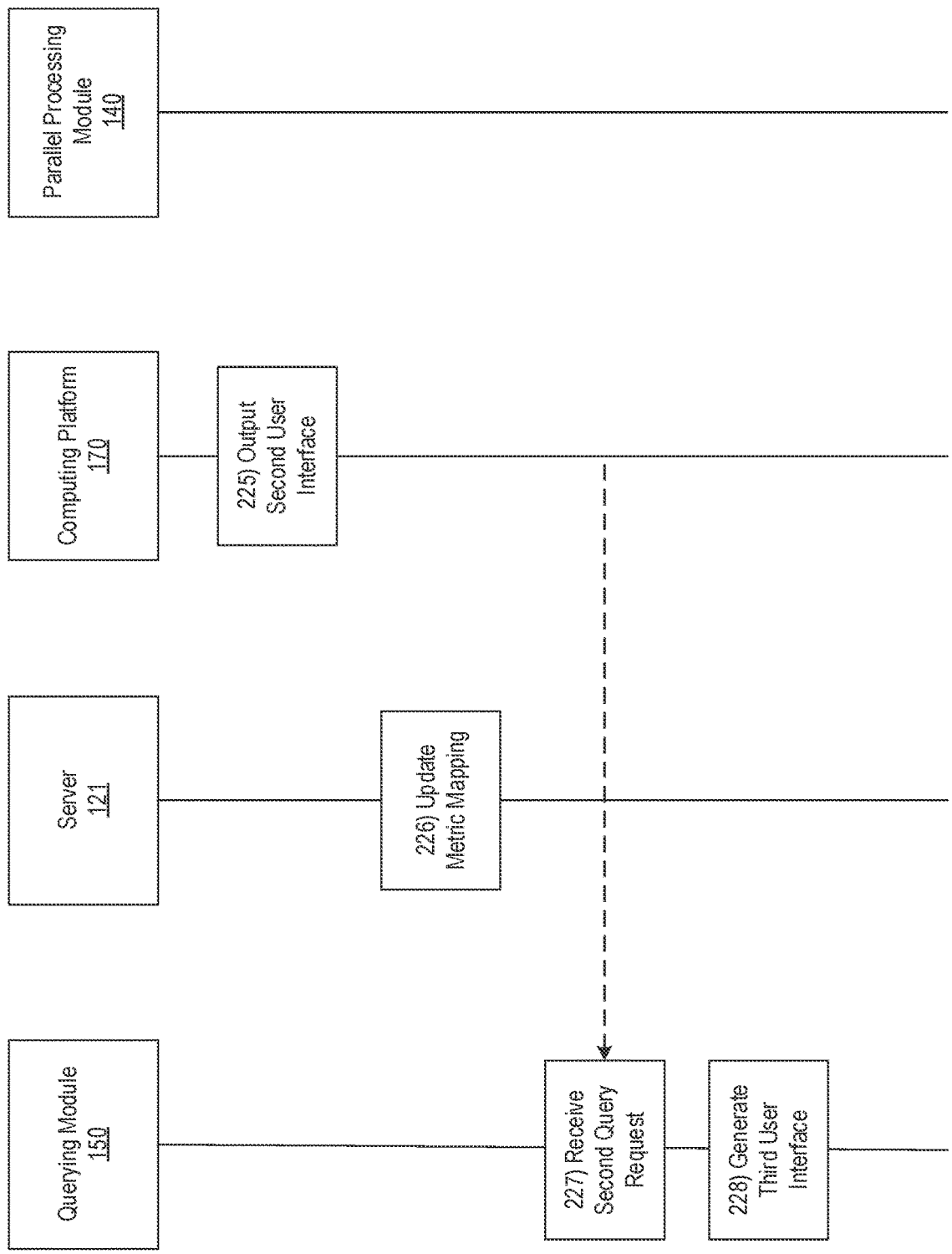

Referring back to FIG. 2F, at step 223, querying module 150 may send the second graphical user interface 320 generated by querying module 150 at step 222 to computing platform 170. The sending of the second graphical user interface 320 by querying module 150 to computing platform 170 may cause and/or be configured to cause computing platform 170 to output the second graphical user interface 320 for display to a user. Specifically, at step 224, computing platform 170 may receive the second graphical user interface 320 from querying module 150. Referring to FIG. 2G, at step 225, computing platform 170 may output the second graphical user interface 320 received by computing platform 170 from querying module 150 to a display device of computing platform 170.

At step 226, secondary node of server 121 may update, for each calculated metric, the corresponding self-organizing map used to generate the metric mapping table and the metric mapping table itself. To update the corresponding self-organizing map for each calculated metric, secondary node of server 121 may send the metric data from the query, any data from the metric mapping table used to calculate the metric, and the calculated metric value to cognitive learning module of server 121. Cognitive learning module of server 121 (which is similar to cognitive learning module of server 122 and discussed in more detail below with reference to FIG. 2K) may then re-train the self-organizing map for a metric using the data sent from secondary node of server 121 and generate, as a result of the retrained self-organizing map, an updated metric mapping table. The updated self-organizing map and/or updated metric mapping table may be distributed by secondary node of server 121 to one or more of the servers of distributed storage and cognitive learning module 120.

At step 227, querying module 150 may receive a second query request from computing platform 170. Computing platform 170 may send the query request to querying module 150 in response to receiving a user request at computing platform 170 to submit a query to querying module 150. Although steps 227-249 are illustrated as occurring after steps 201-226, this is for illustrative purposes only, and one or more of steps 227-249 may occur in parallel to steps 201-226. Specifically, cloud-based parallel processing and cognitive learning computing platform 110 may be configured to process any given number of query requests in parallel. For example, cloud-based parallel processing and cognitive learning computing platform 110 may be configured to process hundreds of thousands of query requests in real-time and in parallel, as these query requests are received by cloud-based parallel processing and cognitive learning computing platform 110. This high-speed, parallel processing is enabled through the configuration of distributed storage and cognitive learning module 120 of cloud-based parallel processing and cognitive learning computing platform 110 as illustrated in FIG. 1A. As discussed above with reference to FIG. 1A, distributed storage and cognitive learning module 120 of cloud-based parallel processing and cognitive learning computing platform 110 may include multiple servers (although only two servers, server 121 and server 122 are illustrated), each including a secondary node and cognitive learning module, and each storing the metric mapping tables needed to calculate user-requested metrics. As parallel processing module 140 of cloud-based parallel processing and cognitive learning computing platform 110 receives the metric calculation requests from querying module 150, parallel processing module 140 distributes the different metric calculation requests to different secondary nodes across the different servers of distributed storage and cognitive learning module 120 of cloud-based parallel processing and cognitive learning computing platform 110. As discussed above, such a distribution may depend on different parameters, such as the different processing loads across the different secondary nodes of the servers of distributed storage and cognitive learning module 120 of cloud-based parallel processing and cognitive learning computing platform 110, the storage locations of the different metric data, the processing load required by any given metric calculation request, and/or the like. This enables cloud-based parallel processing and cognitive learning computing platform 110 to process hundreds of thousands of metric calculation requests in parallel and in real-time.

Figure 2H:
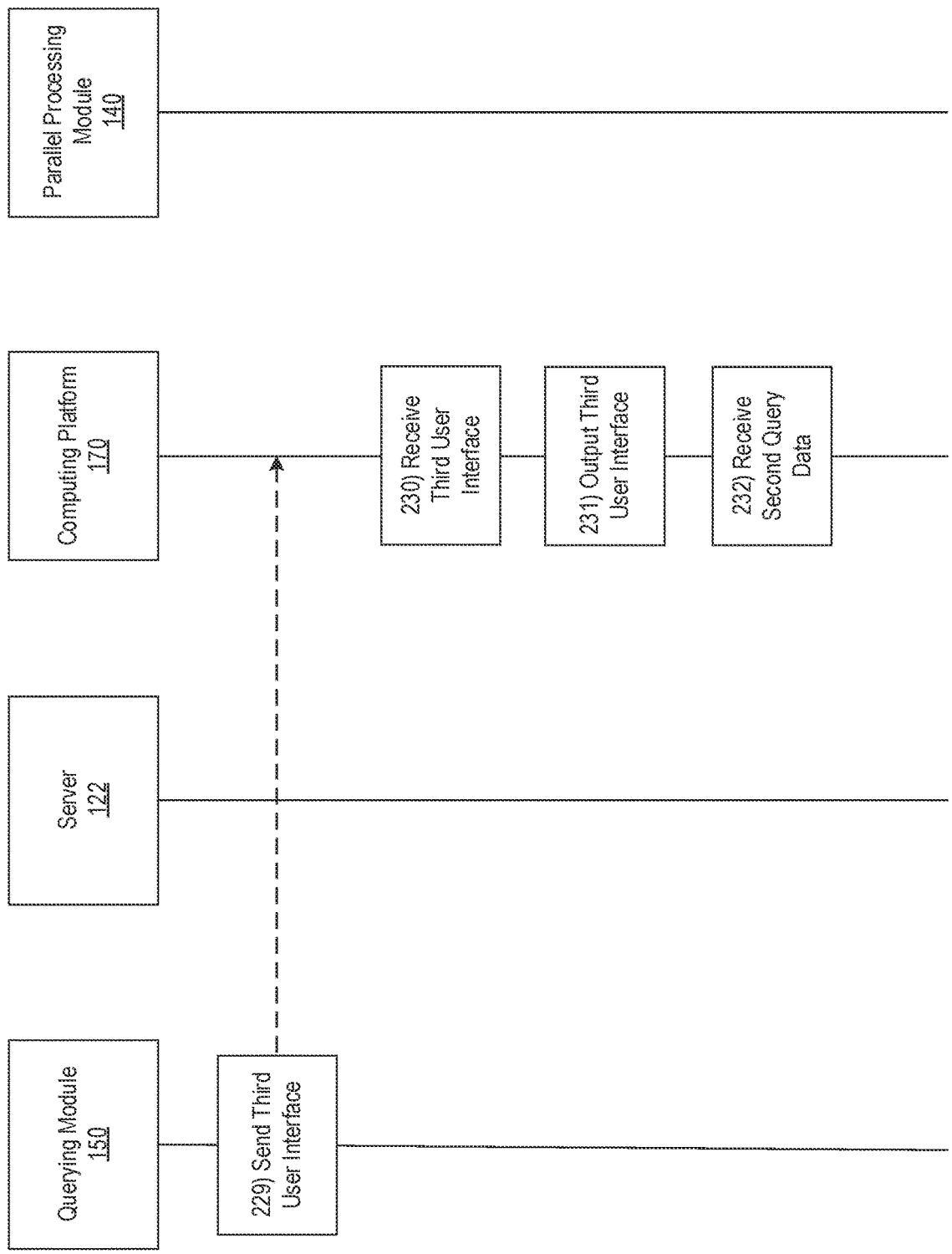

In response to receiving the second query request from computing platform 170 at step 227, querying module 150 may generate, at step 228, a third graphical user interface. The third user interface generated by querying module 150 may be similar to the first graphical user interface 300 shown in FIG. 3A. Referring to FIG. 2H, at step 229, querying module 150 may send the third graphical user interface generated by querying module 150 at step 228 to computing platform 170. The sending of the third graphical user interface by querying module 150 to computing platform 170 may cause and/or be configured to cause computing platform 170 to output the third graphical user interface for display to a user. Specifically, at step 230, computing platform 170 may receive the third graphical user interface from querying module 150. At step 231, computing platform 170 may output the third graphical user interface received by computing platform 170 from querying module 150 to a display device of computing platform 170.

Figure 2I:
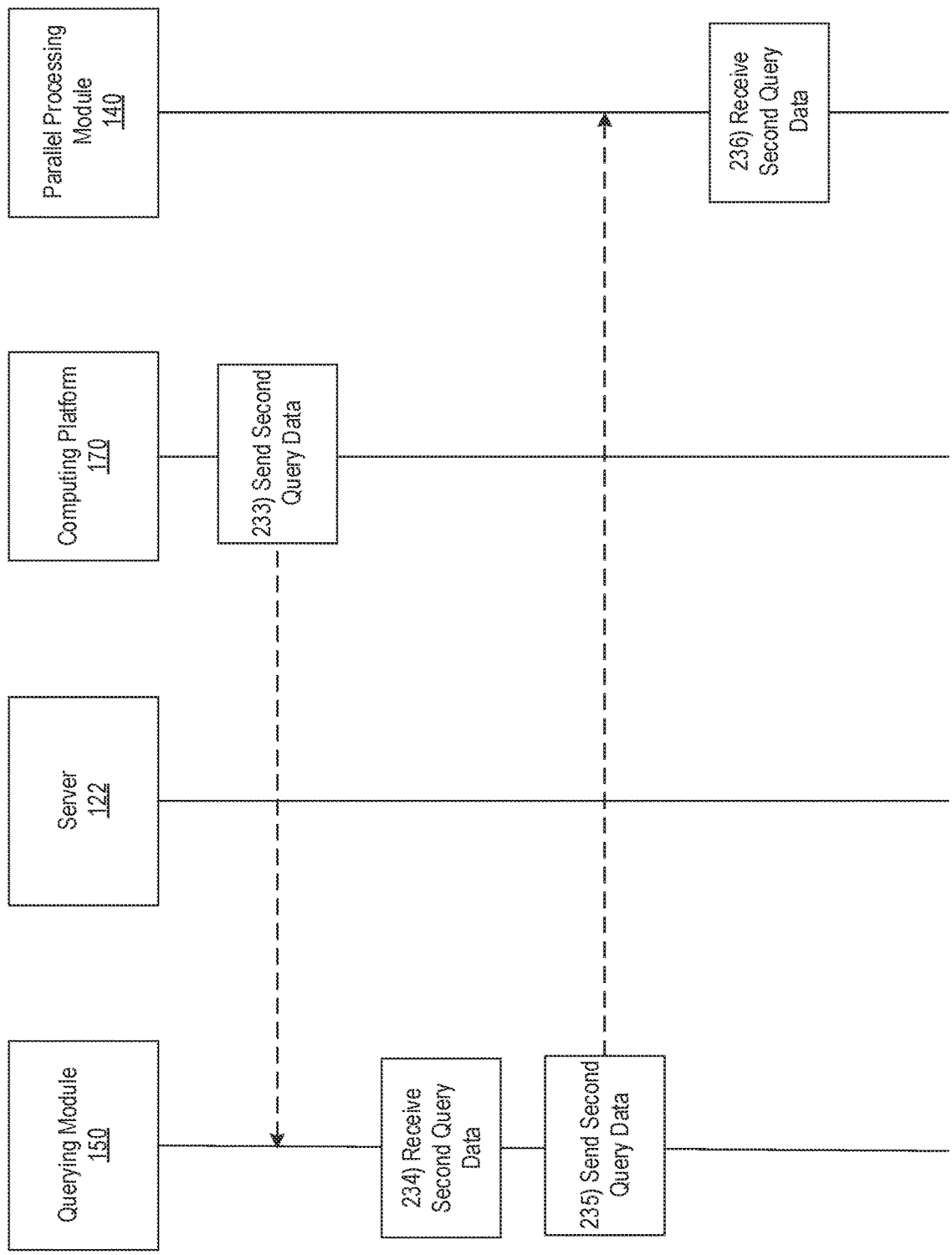

At step 232, in response to outputting the third graphical user interface to the display device, computing platform 170 may receive second query data via the third graphical user interface. The second query data may include the requested metrics and the metric calculation data discussed above with reference to FIG. 3A. Referring to FIG. 2I, at step 233, computing platform 170 may send the second query data (e.g., the requested metrics and the metric calculation data) to querying module 150. At step 234, querying module 150 may receive the second query data from computing platform 170.

Figure 2J:
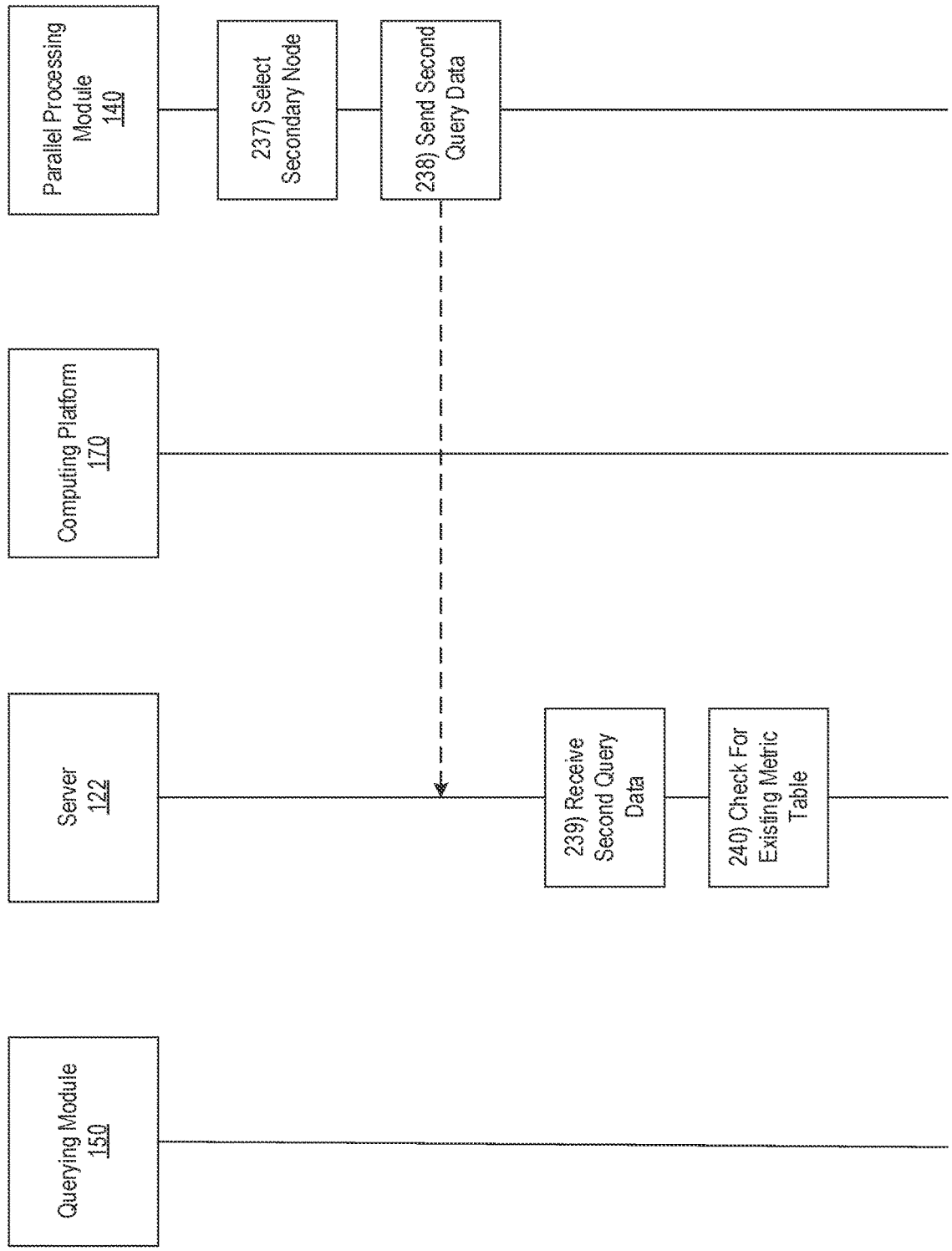

At step 235, querying module 150 may send the second query data received from computing platform 170 to parallel processing module 140 of cloud-based parallel processing and cognitive learning computing platform 110. At step 236, parallel processing module 140 may receive the second query data from querying module 150. In one example, the second query data may be received by a primary node of parallel processing module 140. Referring to FIG. 2J, at step 237, parallel processing module 140 may process the second query data to select a secondary node of distributed storage and cognitive learning module 120 of cloud-based parallel processing and cognitive learning computing platform 110 to process the second query. In one example, this processing and selecting may be performed by the primary node of parallel processing module 140 that received the second query data from querying module 150. Similar to the discussion above with respect to the first query, parallel processing module 140 may consider any number and/or combination of parameters when selecting the secondary node to process the second query. For example, parallel processing module 140 may consider the location of the data that will be needed to calculate the requested metric(s) in the second query (for example, which server(s) of distributed storage and cognitive learning module 120 of cloud-based parallel processing and cognitive learning computing platform 110 store the metric data that would be needed to calculate the requested metric(s) in the second query, the current processing load of each secondary node (and/or its corresponding server) of distributed storage and cognitive learning module 120 of cloud-based parallel processing and cognitive learning computing platform 110, the projected processing load of calculating the requested metric(s) in the second query, and/or the like). In addition, parallel processing module 140 may assign weights to any parameters when considering multiple parameters during the selection of a secondary node.

At step 238, parallel processing module 140 may send the second query data to the server of distributed storage and cognitive learning module 120 corresponding to the selected secondary node of distributed storage and cognitive learning module 120 of cloud-based parallel processing and cognitive learning computing platform 110 (here, server 122 of distributed storage and cognitive learning module 120). At step 239, secondary node of server 122 may receive the second query data from parallel processing module 140. As discussed above, the second query data may include one or more metrics to be calculated by cloud-based parallel processing and cognitive learning computing platform 110 (or more specifically here, secondary node of server 122), and for each of those one or more metrics, underlying metric data to be used to configure the calculation.

At step 240, secondary node of server 122 may determine, for a given metric of the one or more requested metrics, whether an existing metric mapping table already exists for that requested metric. To make such a determination, secondary node of server 122 may query the memory of server 122 to determine if the memory of server 122 is currently storing a metric mapping table corresponding to the requested metric. In response to determining that the memory of server 122 does not currently store a metric mapping table corresponding to the requested metric, secondary node of server 122 may send a request to cognitive learning module of server 122 of distributed storage and cognitive learning module 120 to generate the metric mapping table for the requested metric.

Figure 5:
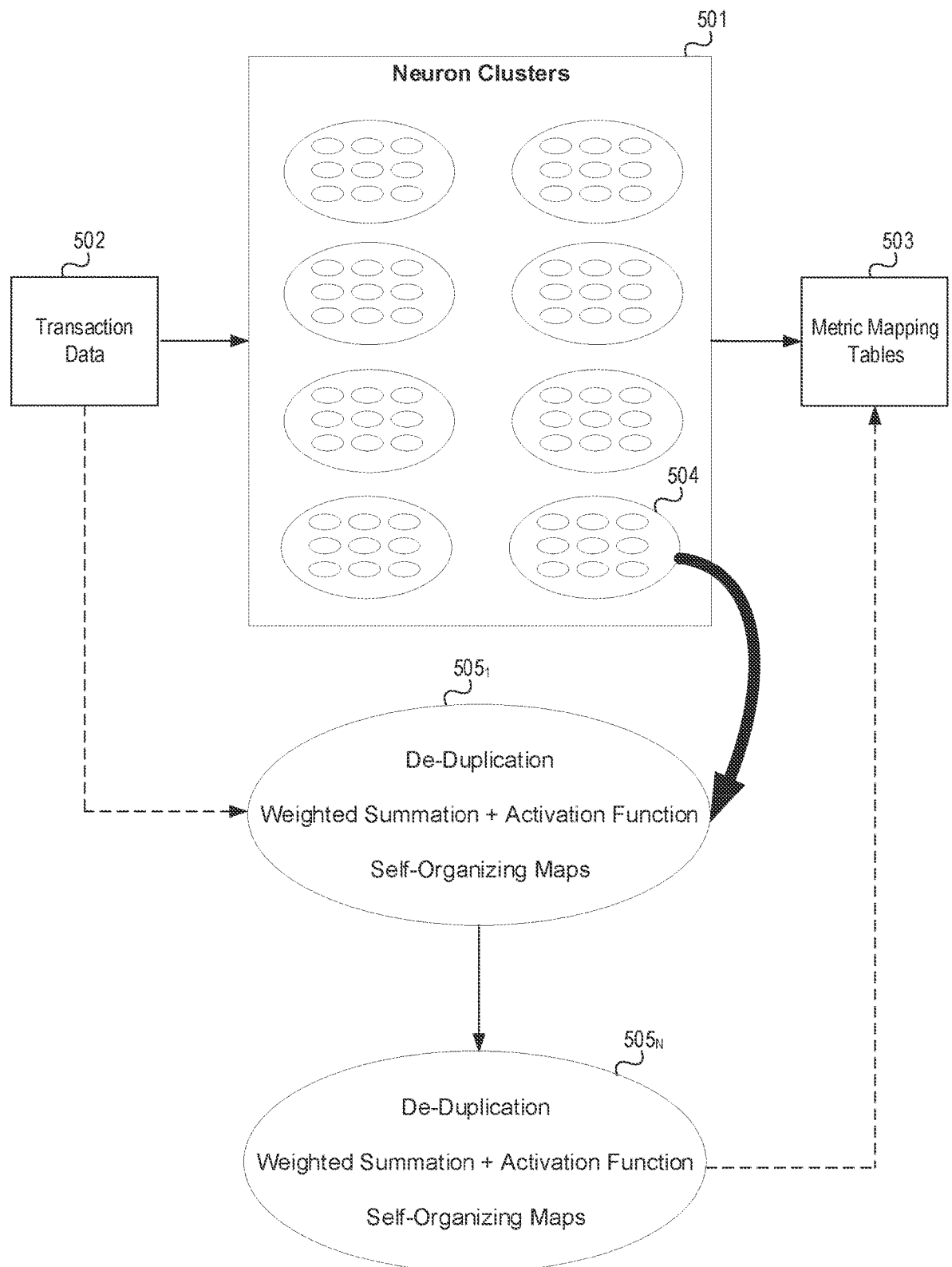
FIG. 5 illustrates one example of a cognitive learning module comprising neuron clusters that receive transaction data as input and employ cognitive learning to generate metric mapping tables that may be used to calculate metric values in accordance with one or more example embodiments.

Referring to FIG. 5, cognitive learning module of server 122 may be a programmable neural network comprising neuron clusters 501 that receive transaction data 502 as input and employ cognitive learning to generate metric mapping tables 503 that may be used to calculate metric values. At a high-level, cognitive learning module of server 122 functions by a first one or more neurons $505_1$ of neuron cluster 504 of cognitive learning module of server 122 receiving an input (transaction data 502), processing that input to generate one or more outputs (such as a self-organizing map), and sending the input and/or one or more outputs to a second one or more neurons $505_N$ of neuron cluster 504 of cognitive learning module of server 122 for additional processing. In another example, the first one or more neurons and second one or more neurons may be in different neuron clusters. This process may be repeated for hundreds of thousands of inputs, such that cognitive learning module of server 122 may process many inputs in parallel by distributing the different inputs across its network of neurons for processing.

Cognitive learning module of server 122 may be initially trained using multiple algorithms and historical data. For example, transactional data maintained by a financial enterprise may be initially used to train and program cognitive learning module of server 122. Subsequent to the initial training, cognitive learning module of server 122 may be continuously updated (i.e., the training of cognitive learning module of server 122 may be continuously ongoing) using additional transactional data as it is generated by the financial enterprise. Additionally, or alternatively, cognitive learning module of server 122 may continuously updated via a feedback loop, wherein calculated metric values (and/or the data used to calculate the metric value) may be fed back into cognitive learning module of server 122. Thus, over time, cognitive learning module of server 122 may be fine-tuned to produce increasingly accurate results.

The neuron clusters 501 of cognitive learning module of server 122 map the transactional data (received during the initial training and subsequently received as generated by the financial enterprise) to metric mapping tables 503. Each neuron cluster 504 of cognitive learning module of server 122 may comprise a plurality of programmable quadratic function neurons $505_1$ . . . $505_N$. Each neuron may be programmed to process the transactional data by masking the transactional data (to remove confidential or sensitive data), deduplicating the transactional data, and/or the like. Each neuron may further be programmed to assign different weights to its incoming data (i.e., the incoming transactional data), and to perform a weighted summation of its incoming data based on those weights. Each neuron may further be programmed with a different activation function (for example, rectified linear unit activation function, sigma activation function, etc.) which may be utilized by the neuron to reduce the variation in the mapping between the inputted data (the transactional data) and the output data of the neuron. The activation functions may be quadratic activation functions. Each neuron may further be programmed to produce (or update) a self-organizing map using the inputted data, which may subsequently be the basis for the outputted metric mapping table generated by cognitive learning module of server 122.

The self-organizing map generated by first one or more neurons of a first neuron cluster may subsequently be sent to second one or more neurons of a second neuron cluster for further refinement. One or more neurons from the second neuron cluster, which may be programmed with different weights and activation functions than that of the neuron from the first neuron cluster, may refine and adjust the self-organizing map generated by the first neuron cluster such that the self-organizing map is more accurate. The neuron from the second neuron cluster may refine the self-organizing map by adjusting the weights of the self-organizing map and using a different activation function. Once the self-organizing map has been processed by at least two different neuron clusters, cognitive learning module of server 122 may generate a corresponding metric mapping table based on the self-organizing map. This process may be repeated for any different number of metrics. Each of the metric mapping tables generated by cognitive learning module of server 122 may be stored in the memory of server 122. Additionally, each of the metric mapping tables generated by cognitive learning module of server 122 may be distributed to one or more additional servers of distributed storage and cognitive learning module 120, such as server 121.

Figure 2K:
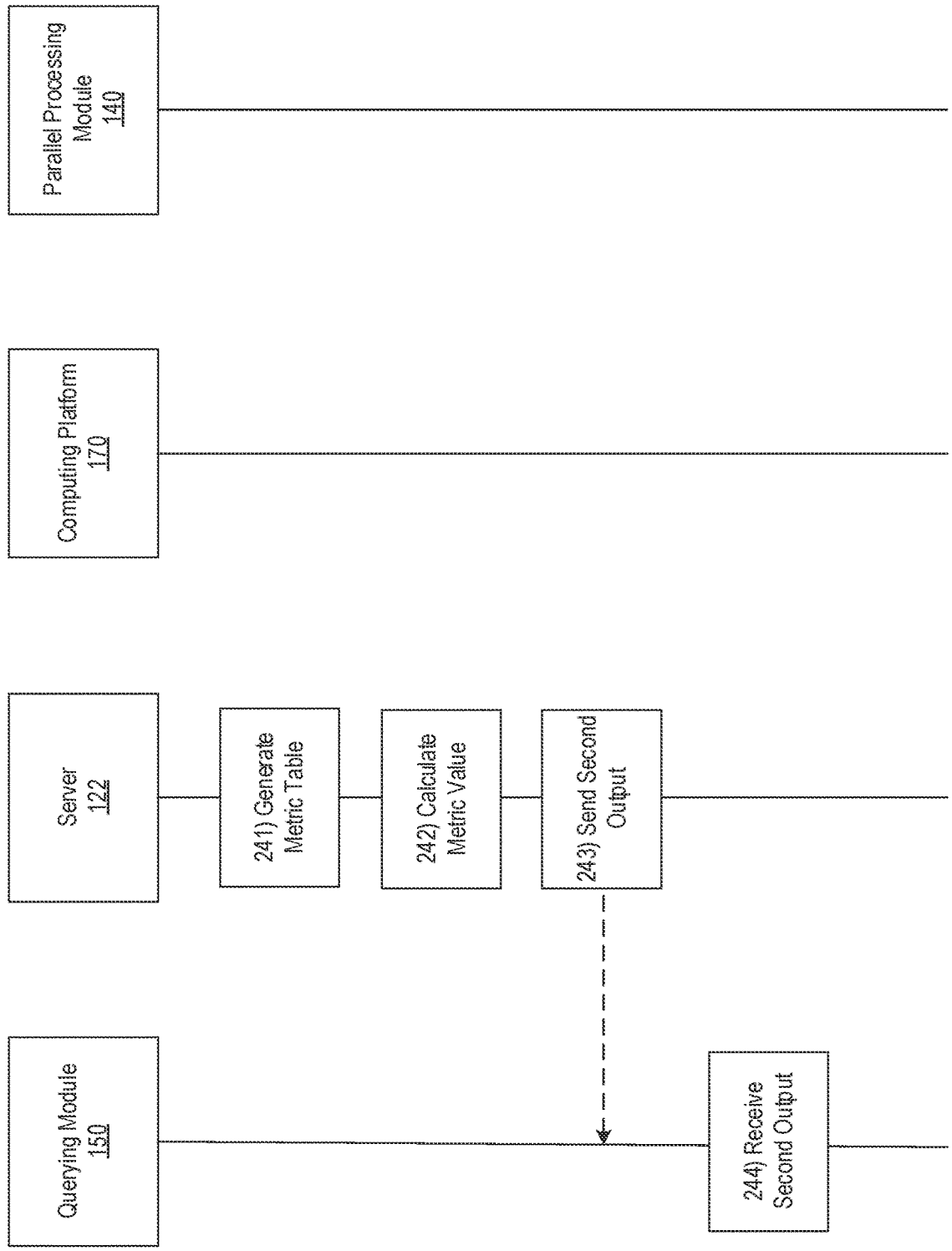

Referring to FIG. 2K, at step 241, in response to cognitive learning module of server 122 receiving the request from secondary node of server 122 to generate the metric mapping table for the requested metric, cognitive learning module of server 122 may generate the metric mapping table for the requested metric using the process discussed above. The metric mapping table generated by cognitive learning module of server 122 may be stored within the memory of server 122. Once cognitive learning module of server 122 has generated the metric mapping table and stored the metric mapping table in the memory of server 122, cognitive learning module of server 122 may send a notification to secondary node of server 122 indicating that the requested metric table has been generated and stored in the memory of server 122.

In response to secondary node of server 122 receiving the notification from cognitive learning module of server 122, secondary node of server 122 may calculate, at step 242, the requested metric using the corresponding metric mapping table and the metric data from the second query data. The metric data may specify particular data points to configure the metric calculation. The steps of determining whether an existing metric table exists for each requested metric, generating the metric table if one does not exist, and calculating the requested metric using an existing or newly generated metric mapping table may be repeated for each requested metric included in the second query data received by secondary node of server 122 from parallel processing module 140 at step 239. Secondary node of server 122 may process each requested metric in parallel or serially. At step 243, secondary node of server 122 may send the output to querying module 150. The output generated by secondary node of server 122 and sent to querying module 150 may comprise each of the metric values calculated by secondary node of server 122 based on the metric mapping table(s) and metric data, and corresponding metric calculation data.

Figure 2L:
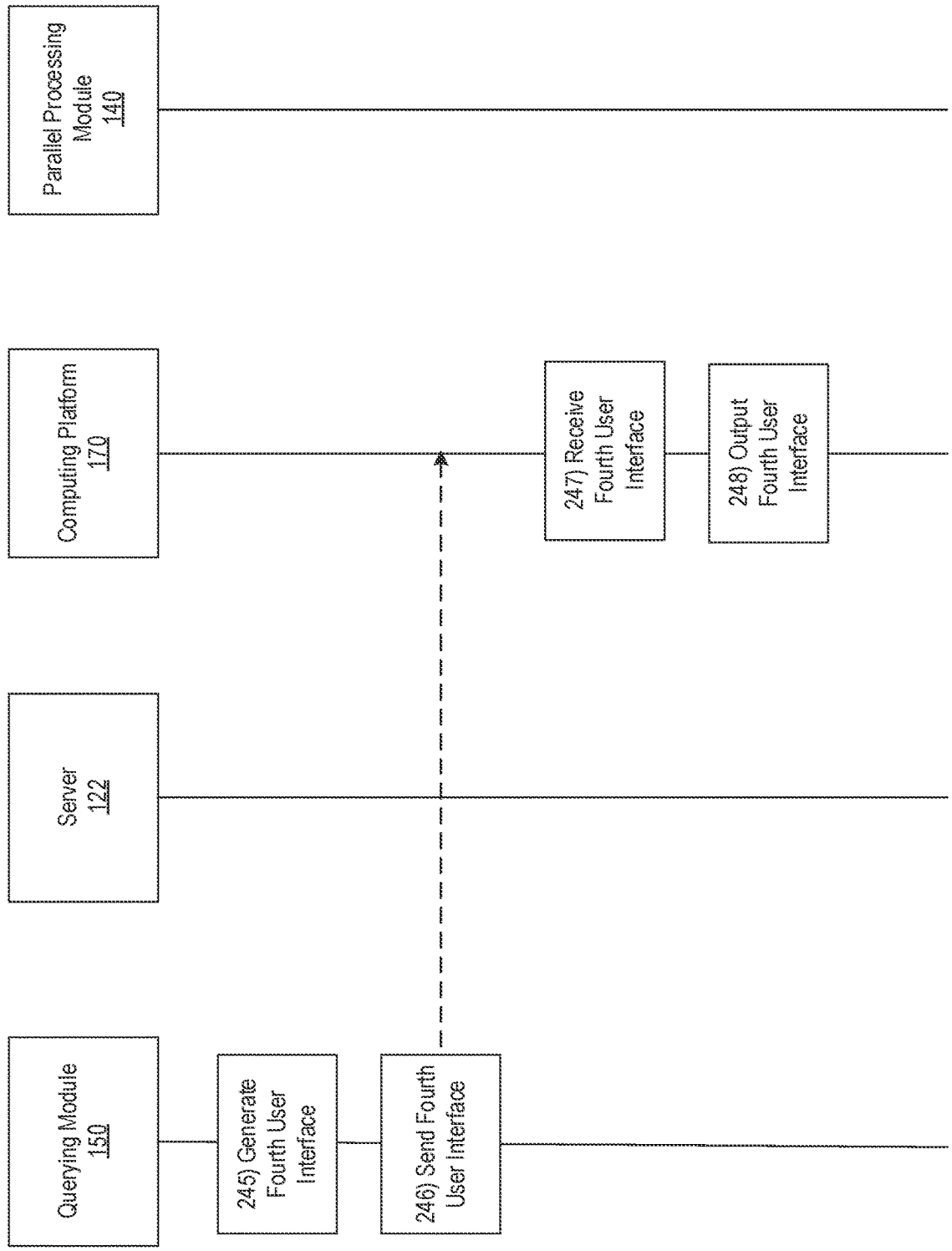

At step 244, querying module 150 may receive the output sent by secondary node of server 122 of distributed storage and cognitive learning module 120. Referring to FIG. 2L, at step 245, in response to receiving the output from secondary node of server 122, querying module 150 may generate a fourth graphical user interface. The fourth graphical user interface may be similar to the graphical user interface discussed with reference to FIG. 3B (and generated by querying module 150 at step 222). At step 246, querying module 150 may send the fourth graphical user interface generated by querying module 150 at step 245 to computing platform 170. The sending of the fourth graphical user interface by querying module 150 to computing platform 170 may cause and/or be configured to cause computing platform 170 to output the fourth graphical user interface for display to a user. Specifically, at step 247, computing platform 170 may receive the fourth graphical user interface from querying module 150. At step 248, computing platform 170 may output the fourth graphical user interface received by computing platform 170 from querying module 150 to a display device of computing platform 170.

With reference to FIG. 2M, at step 249, secondary node of server 122 may update, for each calculated metric, the corresponding self-organizing map used to generate the metric mapping table, as well as the metric mapping table itself. To update the corresponding self-organizing map for each calculated metric, secondary node of server 122 may send the metric data from the query, any data from the metric mapping table used to calculate the metric, and the calculated metric value to cognitive learning module of server 122. Cognitive learning module of server 122 may then re-train its self-organizing map for a metric using the data sent from secondary node of server 122 and generate, as a result of the updated self-organizing map, an updated metric mapping table. The updated self-organizing map and/or updated metric mapping table may be distributed by secondary node of server 122 to one or more of the servers of distributed storage and cognitive learning module 120 of cloud-based parallel processing and cognitive learning computing platform 110.

As noted above, cloud-based parallel processing and cognitive learning computing platform 110 may include modules in addition to those discussed above (distributed storage and cognitive learning module 120 (including server 121, server 122, and/or the like), data aggregation module 130, parallel processing module 140, and querying module 150). These additional modules may implement other functionality for cloud-based parallel processing and cognitive learning computing platform 110. For instance, an ancillary module 135 and/or an expert module 145 may be implemented for high-level management of cloud-based parallel processing and cognitive learning computing platform 110. The ancillary module 135 may be utilized by cloud-based parallel processing and cognitive learning computing platform 110 to manually override one or more servers of distributed storage and cognitive learning module 120 should a server cease functioning. The ancillary module 135 may further be utilized to manage the metric mapping tables, such as the deletion of a given metric mapping table. The ancillary module 135 may further be utilized to track the functionality of the secondary nodes of distributed storage and cognitive learning module 120, and replacing/generating secondary nodes if needed. The ancillary module 135 may further be utilized to analyze the interdependencies between the different metrics. The expert module 145 may be utilized by cloud-based parallel processing and cognitive learning computing platform 110 to leverage historical metric and/or transaction data to identify corrective processes for metrics that have deviated from target values.

Figure 4A:
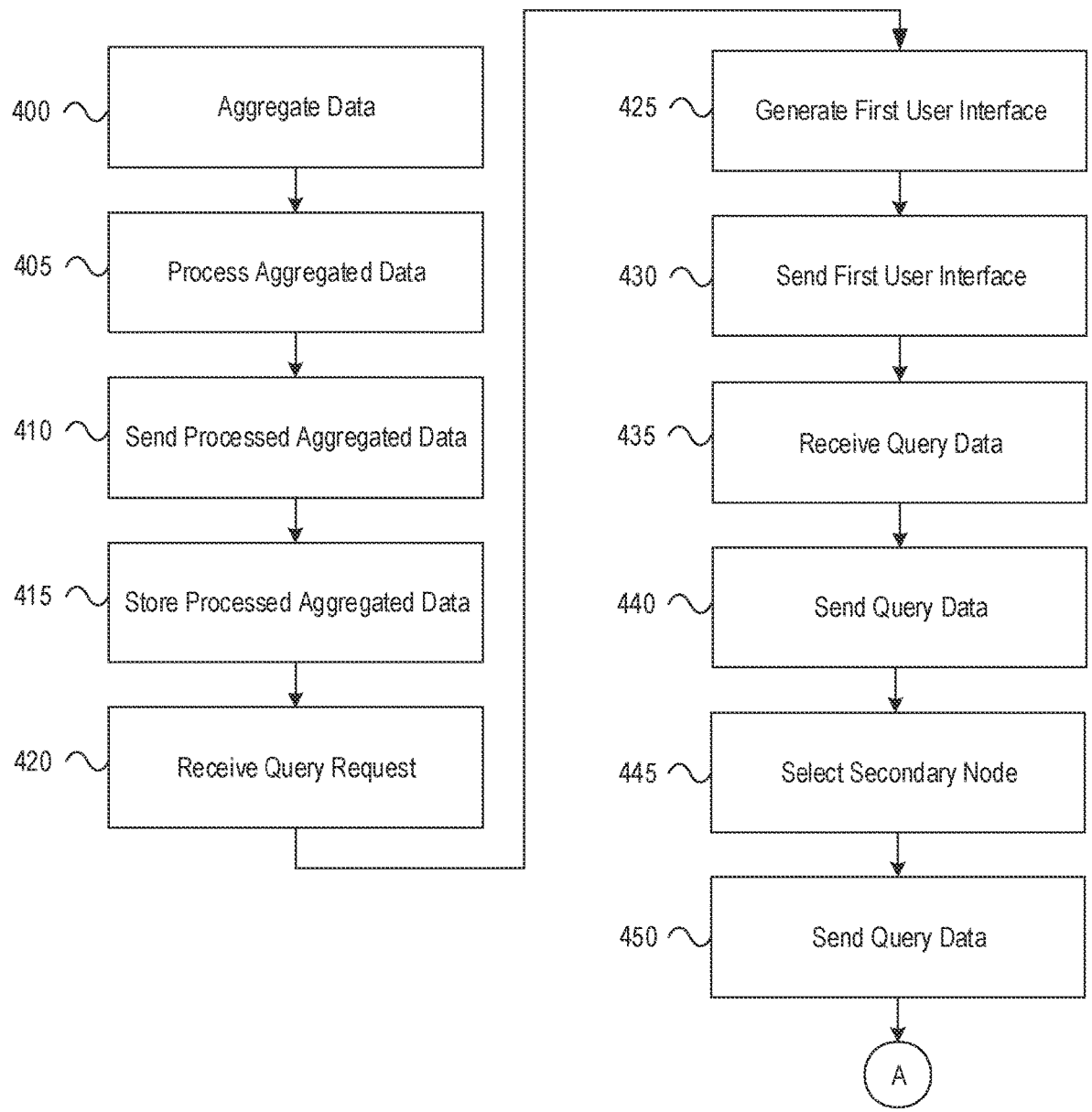
FIGS. 4A-4B depicts an illustrative method for implementing a cloud-based parallel processing and cognitive learning computing platform in accordance with one or more example embodiments.
Figure 4B:
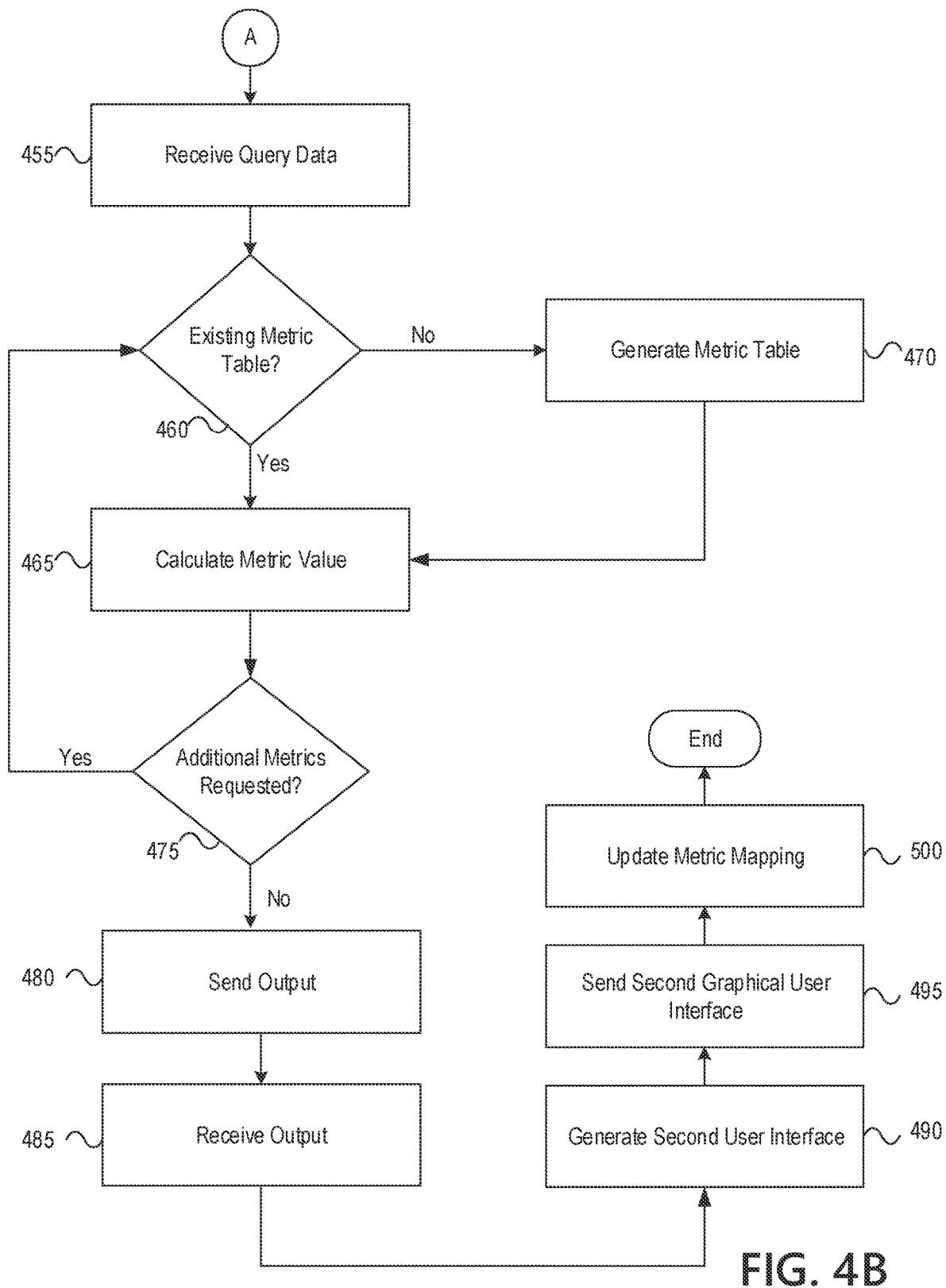

FIGS. 4A-4B depict an illustrative method for implementing a cloud-based parallel processing and cognitive learning computing platform in accordance with one or more example embodiments. Referring to FIG. 4A, at step 400, a data aggregation module of a cloud-based parallel processing and cognitive learning computing platform having at least one processor, a communication interface, and memory, may aggregate data from one or more computing systems. At step 405, the data aggregation module may process the aggregated data. At step 410, the data aggregation module may send the processed aggregated data to a distributed storage and cognitive learning module of the cloud-based parallel processing and cognitive learning computing platform. At step 415, the distributed storage and cognitive learning module may store the processed aggregated data on one or more of its servers. At step 420, a querying module of the cloud-based parallel processing and cognitive learning computing platform may receive a query request from a computing platform. At step 425, the querying module may generate a first graphical user interface. At step 430, the querying module may send the first graphical user interface to the computing platform. The sending of the first graphical user interface by the querying module to the computing platform may cause, or be configured to cause, the computing platform to output the first graphical user interface for display to a display device of the computing platform. At step 435, the querying module may receive query data from the computing platform. The query data may comprise a request to calculate one or more metric values. At step 440, the querying module may send the query data to a parallel processing module of the cloud-based parallel processing and cognitive learning computing platform. At step 445, the parallel processing module may select a secondary node of a first server of the distributed storage and cognitive learning module of the cloud-based parallel processing and cognitive learning computing platform to process the query request. At step 450, the parallel processing module may send the query request to the secondary node of the first server.

Referring to FIG. 4B, at step 455, the secondary node of the first server may receive the query data from the parallel processing module. At step 460, the secondary node of the first server may determine, for a first requested metric of the one or more requested metrics of the query request, whether a metric mapping table corresponding to the first requested metric exists. If the secondary node of the first server determines that a metric mapping table exists for the first requested metric, the secondary node of the first server may, at step 465, calculate a value for the first requested metric using the existing metric mapping table. If the secondary node of the first server determines that a metric mapping table does not exist for the first requested metric, the secondary node of the first server may send a request to a cognitive learning mapping module of the distributed storage and cognitive learning module to generate the metric mapping table for the first requested metric. At step 470, the cognitive learning mapping module of the first server may generate the metric mapping table for the first requested metric. Processing may then return to step 465, where the secondary node of the first server may calculate a value for the first requested metric using the generated metric mapping table.

At step 475, the secondary node of the first server may determine if the query data includes additional requested metrics. If the secondary node of the first server determines that the query data includes additional requested metrics, processing may return to step 460, and the next requested metric may be processed similar to the processing of the first requested metric discussed above with reference to steps 460-470. If the secondary node of the first server determines that the query data does not comprise any additional requested metrics, the secondary node of the first server may, at step 480, send an output to the querying module. The output may comprise the calculated metric value(s) and corresponding metric calculation data. At step 485, the querying module may receive the output from the secondary node of the first server. At step 490, the querying module may generate a second graphical user interface based on the output received from the secondary node of the first server. At step 495, the querying module may send the second graphical user interface to the computing platform. The sending of the second graphical user interface by the querying module to the computing platform may cause, or be configured to cause, the computing platform to output the second graphical user interface for display to a display device of the computing platform. At step 500, the secondary node of the first server of the distributed storage and cognitive learning module may update the metric mapping table for each calculated metric in the query data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, by a querying module of the computing platform and from a second computing platform, a query request;
   generate, in response to receiving the query request, a graphical user interface;
   send, to the second computing platform, the graphical user interface, wherein sending the graphical user interface to the second computing platform is configured to cause the second computing platform to output the graphical user interface for display to a display device of the second computing platform;
   receive, from the second computing platform, query data comprising a plurality of requested metrics;
   select, by a parallel processing module of the computing platform and from a plurality of secondary nodes of the computing platform, a secondary node to process the query request;
   send, by the parallel processing module and to the secondary node, the query request;
   responsive to a determination by the secondary node that a metric mapping table for a first requested metric of the plurality of requested metrics is not stored within the memory of the computing platform, send, by the secondary node and to a cognitive learning module of the computing platform, a request to generate the metric mapping table for the first requested metric;
   generate, by the cognitive learning module, the metric mapping table for the first requested metric;

calculate, by the secondary node and based on the metric mapping table, a value for the first requested metric;

generate, by the querying module, a second graphical user interface comprising the value; and send, to the second computing platform, the second graphical user interface, wherein sending the second graphical user interface to the second computing platform is configured to cause the second computing platform to output the second graphical user interface for display to the display device of the second computing platform.

2. The computing platform of claim 1, the memory storing computer-readable instructions that, when executed by the at least one processor, cause the computing platform to:

calculate, in parallel to calculating the value for the first requested metric, a second value for a second requested metric of the plurality of requested metrics.

3. The computing platform of claim 2, wherein the second value is calculated based on a second metric mapping table associated with the second requested metric.

4. The computing platform of claim 1, wherein the cognitive learning module comprises a plurality of neuron clusters, each neuron cluster of the plurality of neuron clusters comprising a plurality of programmable quadratic function neurons.

5. The computing platform of claim 4, wherein the metric mapping table is generated using a first one or more neurons of a first neuron cluster of the plurality of neuron clusters and a second one or more neurons of a second neuron cluster of the plurality of neuron clusters.

6. The computing platform of claim 5, wherein the first one or more neurons are programmed to use a first quadratic activation function to generate a first output that is sent to the second one or more neurons, and wherein the second one or more neurons are programmed to use a second quadratic activation function to refine the first output.

7. The computing platform of claim 6, wherein the first one or more neurons are programmed to use first weights and the second one or more neurons are programmed to use second weights.

8. The computing platform of claim 1, wherein the secondary node is selected based on a current processing load of each of the plurality of secondary nodes.

9. The computing platform of claim 8, wherein the secondary node is further selected based on an estimated processing load for the query data.

10. A method comprising:

at a computing platform comprising at least one processor, a communication interface, and memory:

receiving, by a querying module of the computing platform and from a second computing platform, a query request;

generating, in response to receiving the query request, a graphical user interface;

sending, to the second computing platform, the graphical user interface, wherein sending the graphical user interface to the second computing platform is configured to cause the second computing platform to output the graphical user interface for display to a display device of the second computing platform;

receiving, from the second computing platform, query data comprising a plurality of requested metrics;

selecting, by a parallel processing module of the computing platform and from a plurality of secondary nodes of the computing platform, a secondary node to process the query request;

sending, by the parallel processing module and to the secondary node, the query request;

responsive to a determination by the secondary node that a metric mapping table for a first requested metric of the plurality of requested metrics is not stored within the memory of the computing platform, sending, by the secondary node and to a cognitive learning module of the computing platform, a request to generate the metric mapping table for the first requested metric;

generating, by the cognitive learning module, the metric mapping table for the first requested metric;

calculating, by the secondary node and based on the metric mapping table, a value for the first requested metric;

generating, by the querying module, a second graphical user interface comprising the value; and sending, to the second computing platform, the second graphical user interface, wherein sending the second graphical user interface to the second computing platform is configured to cause the second computing platform to output the second graphical user interface for display to the display device of the second computing platform.

11. The method of claim 10, further comprising:

calculating, by the secondary node and in parallel to calculating the value for the first requested metric, a second value for a second requested metric of the plurality of requested metrics.

12. The method of claim 11, wherein the second value is calculated based on a second metric mapping table associated with the second requested metric.

13. The method of claim 10, wherein the cognitive learning module comprises a plurality of neuron clusters, each neuron cluster of the plurality of neuron clusters comprising a plurality of programmable quadratic function neurons.

14. The method of claim 13, wherein the metric mapping table is generated using a first one or more neurons of a first neuron cluster of the plurality of neuron clusters and a second one or more neurons of a second neuron cluster of the plurality of neuron clusters.

15. The method of claim 14, wherein the first one or more neurons are programmed to use a first quadratic activation function to generate a first output that is sent to the second one or more neurons, and wherein the second one or more neurons are programmed to use a second quadratic activation function to refine the first output.

16. The method of claim 15, wherein the first one or more neurons are programmed to use first weights and the second one or more neurons are programmed to use second weights.

17. The method of claim 10, wherein the secondary node is selected based on a current processing load of each of the plurality of secondary nodes.

18. The method of claim 17, wherein the secondary node is further selected based on an estimated processing load for the query data.

19. One or more non-transitory computer-readable media storing instructions that, when executed by a computing platform comprising at least one processor, a communication interface, and memory, cause the computing platform to:

receive, by a querying module of the computing platform and from a second computing platform, a query request;

generate, in response to receiving the query request, a graphical user interface;

send, to the second computing platform, the graphical user interface, wherein sending the graphical user interface to the second computing platform is configured to cause the second computing platform to output the graphical user interface for display to a display device of the second computing platform;

receive, from the second computing platform, query data comprising a plurality of requested metrics;

select, by a parallel processing module of the computing platform and from a plurality of secondary nodes of the computing platform, a secondary node to process the query request;

send, by the parallel processing module and to the secondary node, the query request;

responsive to a determination by the secondary node that a metric mapping table for a first requested metric of the plurality of requested metrics is not stored within the memory of the computing platform, send, by the secondary node and to a cognitive learning module of the computing platform, a request to generate the metric mapping table for the first requested metric;

generate, by the cognitive learning module, the metric mapping table for the first requested metric;

calculate, by the secondary node and based on the metric mapping table, a value for the first requested metric;

generate, by the querying module, a second graphical user interface comprising the value; and send, to the second computing platform, the second graphical user interface, wherein sending the second graphical user interface to the second computing platform is configured to cause the second computing platform to output the second graphical user interface for display to the display device of the second computing platform.

20. The one or more non-transitory computer-readable media of claim 19, storing instructions that, when executed by the computing platform, cause the computing platform to:

calculate, in parallel to calculating the value for the first requested metric, a second value for a second requested metric of the plurality of requested metrics, wherein the second value is calculated based on a second metric mapping table associated with the second requested metric.

* * * * *